United States Patent
Sugano

(10) Patent No.: US 11,651,687 B2
(45) Date of Patent: May 16, 2023

(54) AUTOMATED VALET PARKING SYSTEM

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 17/029,204

(22) Filed: Sep. 23, 2020

(65) Prior Publication Data

US 2021/0139017 A1 May 13, 2021

(30) Foreign Application Priority Data

Nov. 11, 2019 (JP) .............................. JP2019-204091

(51) Int. Cl.
| | |
|---|---|
| *G08G 1/0968* | (2006.01) |
| *B60W 30/06* | (2006.01) |
| *G08G 1/14* | (2006.01) |
| *B60W 60/00* | (2020.01) |
| *G08G 1/0967* | (2006.01) |

(52) U.S. Cl.
CPC ....... *G08G 1/096833* (2013.01); *B60W 30/06* (2013.01); *B60W 60/001* (2020.02); *G08G 1/096725* (2013.01); *G08G 1/096741* (2013.01); *G08G 1/096805* (2013.01); *G08G 1/143* (2013.01); *G08G 1/146* (2013.01)

(58) Field of Classification Search
CPC ....... G08G 1/096833; G08G 1/096725; G08G 1/096741; G08G 1/096805; G08G 1/143; G08G 1/146; B60W 30/06; B60W 60/001
See application file for complete search history.

(56) References Cited

U.S. PATENT DOCUMENTS

| | | | | |
|---|---|---|---|---|
| 2017/0309177 | A1* | 10/2017 | Hoffmann | G08G 1/148 |
| 2019/0275898 | A1* | 9/2019 | Haneda | B60L 15/20 |
| 2019/0382002 | A1* | 12/2019 | Yamazaki | G05D 1/0297 |
| 2020/0001863 | A1* | 1/2020 | Li | G05D 1/0212 |
| 2020/0117202 | A1* | 4/2020 | Tanimori | G08G 1/202 |
| 2020/0312144 | A1* | 10/2020 | Noguchi | G08G 1/143 |
| 2021/0078601 | A1* | 3/2021 | Sugano | G08G 1/149 |
| 2021/0086757 | A1* | 3/2021 | Sugano | G08G 1/142 |
| 2021/0122362 | A1* | 4/2021 | Okamura | B62D 15/0285 |
| 2022/0212657 | A1* | 7/2022 | Sugano | G08G 1/143 |

FOREIGN PATENT DOCUMENTS

JP 2019-121040 A 7/2019

* cited by examiner

*Primary Examiner* — Dale W Hilgendorf
(74) *Attorney, Agent, or Firm* — Dinsmore & Shohl LLP

(57) ABSTRACT

An automated valet parking system performs automated parking in response to a user request for entry or pick-up from a user and causes the self-driving vehicle to perform automated driving along a target route to enter or pick up. The automated valet parking system, when a self-driving vehicle stops in an emergency or experiences a communication interruption and becomes a failed vehicle, sets a restricted area based on parking place map information and a position of the failed vehicle and sets an allowed area in a parking place, including a parking space(s) located outside the restricted area, provides an instruction, based on a position of a subject vehicle that is a self-driving vehicle as a subject of the user request and the set restricted area, to the subject vehicle, and sets a target route such that the subject vehicle parks in the parking space located in the allowed area.

5 Claims, 14 Drawing Sheets

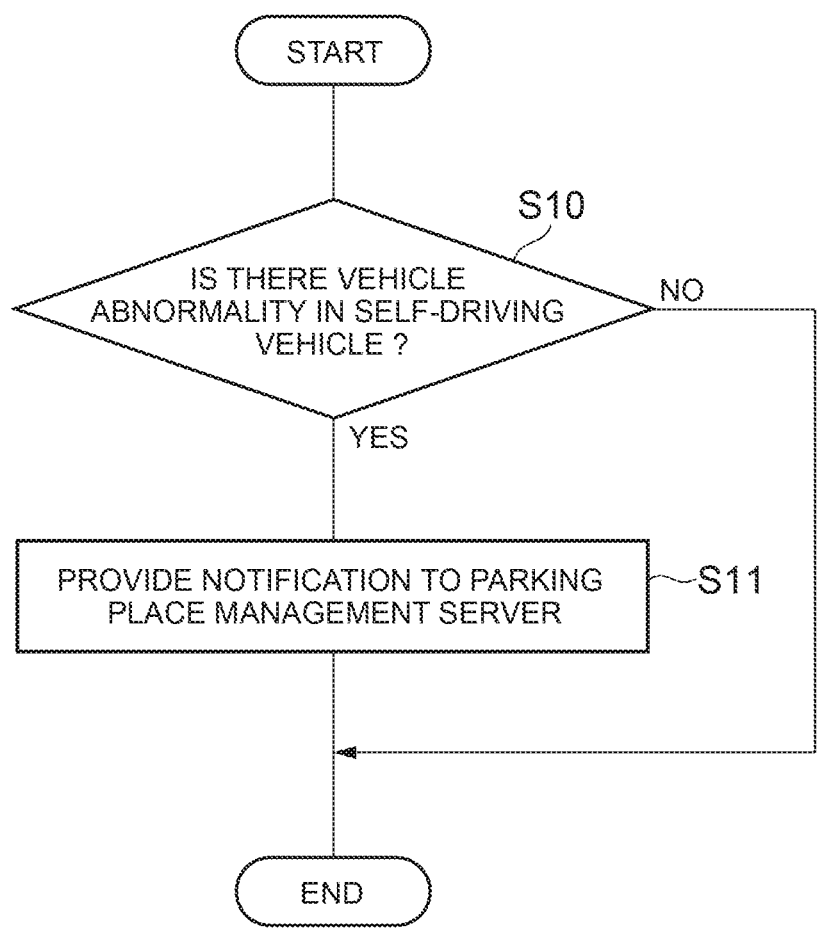

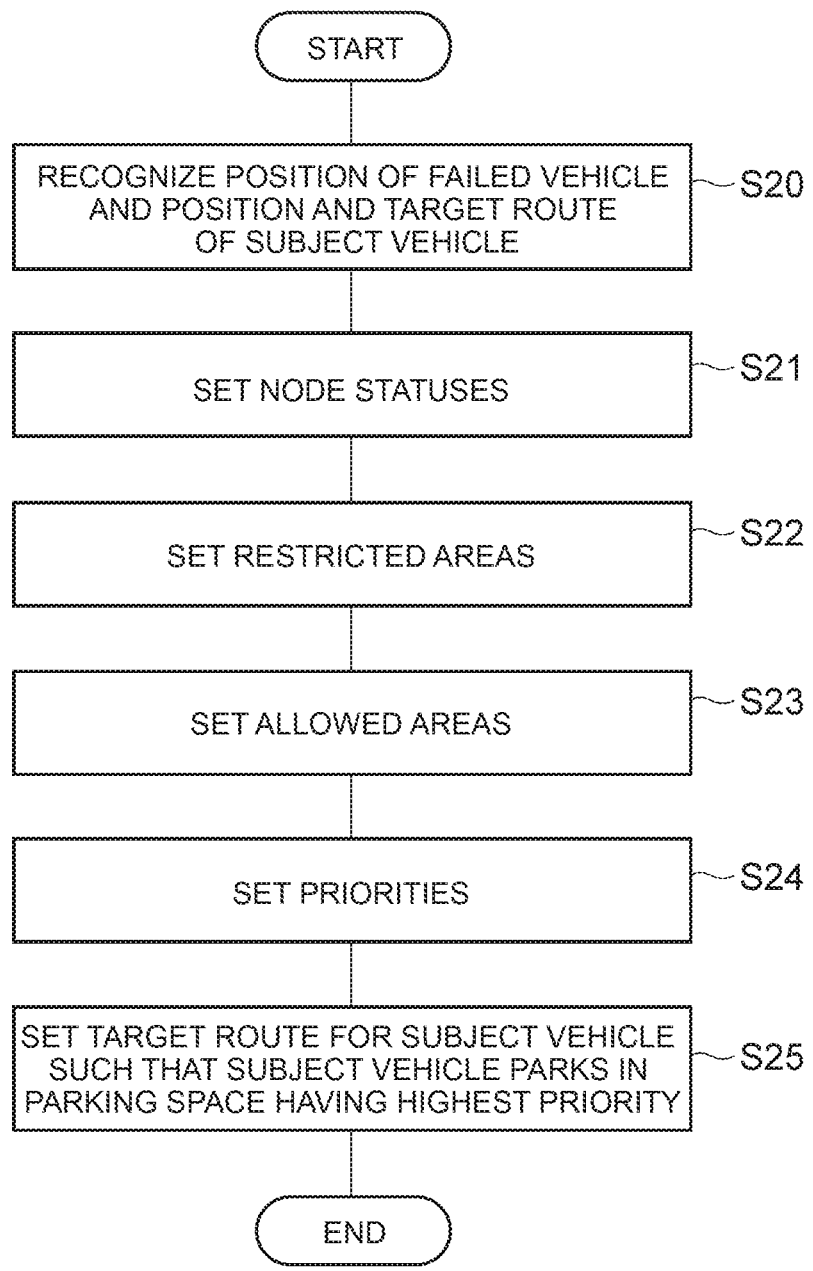

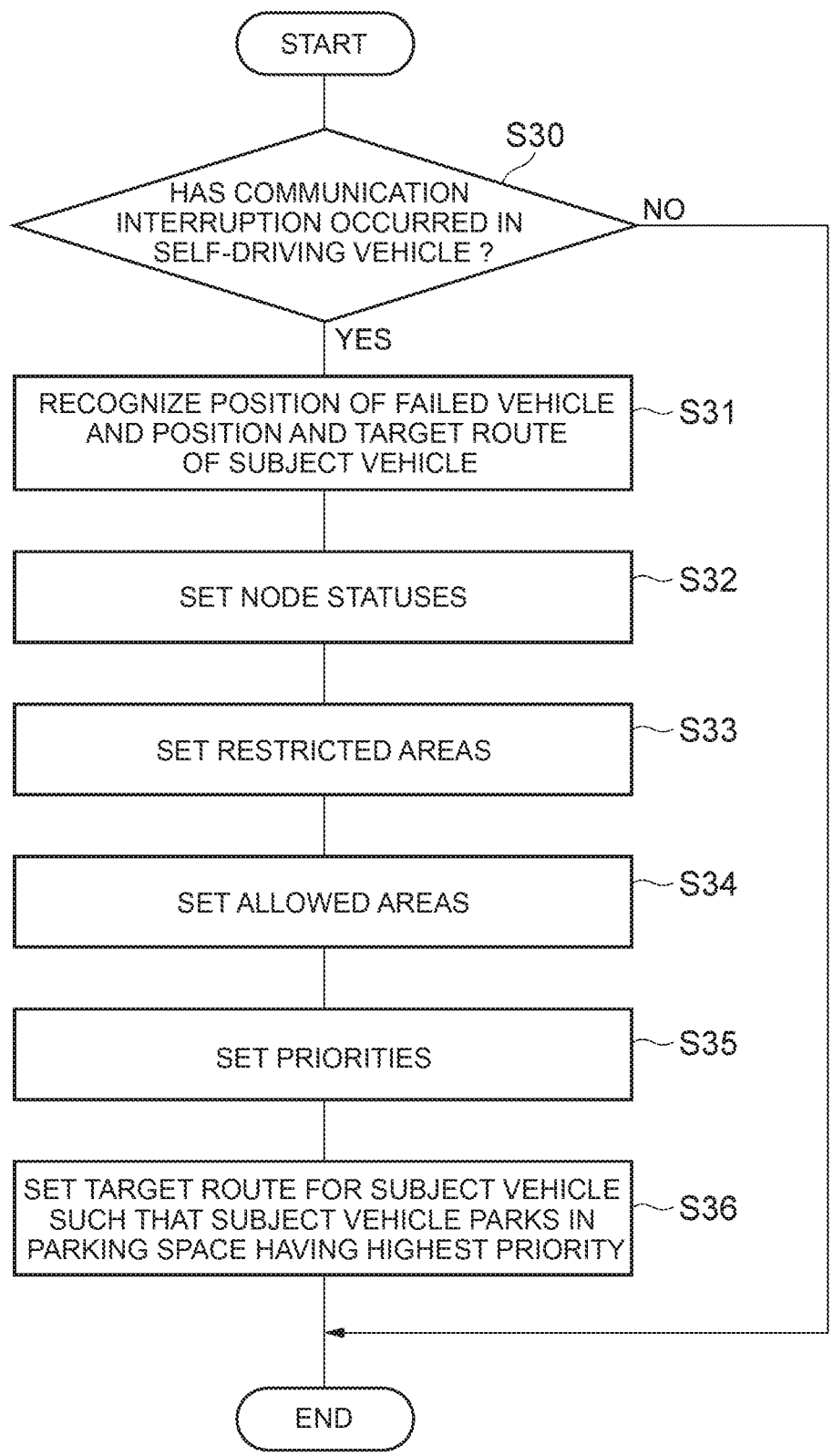

AUTOMATED VALET PARKING SYSTEM

CROSS-REFERENCE TO RELATED APPLICATION

This application claims priority to Japanese Patent Application No. 2019-204091 filed on Nov. 11, 2019, the content of which is incorporated herein by reference in its entirety.

BACKGROUND

1. Technical Field

The disclosure relates to an automated valet parking system.

2. Description of Related Art

Hitherto, Japanese Unexamined Patent Application Publication No. 2019-121040 (JP 2019-121040 A) is known as a technical document relating to an automated valet parking system. This publication describes a parking control apparatus that provides an operation instruction different from a driving instruction to a vehicle based on a result of determination as to whether an obstacle, such as a fallen object on a passage, is on a target route of the vehicle.

SUMMARY

In automated valet parking, while a self-driving vehicle is performing automated parking in a parking place, the self-driving vehicle may stop in an emergency or experience a communication interruption and become a failed vehicle. In such a case, when automated parking is performed in the parking place as usual in response to a user's request for entry and pick-up from the user of a self-driving vehicle, the self-driving vehicle that is a subject of the user's request may be influenced by the failed vehicle, so there is room for study.

An aspect of the disclosure relates to an automated valet parking system that, by providing instructions to a plurality of self-driving vehicles in a parking place, performs automated parking in response to a user request for entry or pick-up from a user of an associated one of the self-driving vehicles and causes the associated one of the self-driving vehicles to perform automated driving along a target route to enter or pick up. The automated valet parking system includes a restricted area setting unit configured to, when at least any one of the self-driving vehicles stops in an emergency or experiences a communication interruption and becomes a failed vehicle, set a restricted area that is an area in the parking place, in which the automated parking of the self-driving vehicle other than the failed vehicle is restricted based on parking place map information and a position of the failed vehicle, and set an allowed area that is an area in the parking place, including a parking space or parking spaces located outside the restricted area, and a vehicle instruction unit configured to, based on a position of a subject vehicle that is the self-driving vehicle serving as a subject of the user request and the restricted area set by the restricted area setting unit, provide the instruction to the subject vehicle. The vehicle instruction unit is configured to set the target route of the subject vehicle such that the subject vehicle parks in the parking space located in the allowed area.

With the automated valet parking system according to the aspect of the disclosure, when at least any one of the self-driving vehicles stops in an emergency or experiences a communication interruption and becomes a failed vehicle, a restricted area and an allowed area are set based on parking place map information and a position of the failed vehicle, and a target route of a subject vehicle is set such that the subject vehicle parks in a parking space located in the allowed area. Thus, it is possible to park the subject vehicle in the parking space located outside the restricted area and less likely to be influenced by the failed vehicle. As a result, in comparison with a case where automated parking of the subject vehicle is performed without consideration of the failed vehicle, it is possible to reduce the influence of the failed vehicle on the subject vehicle.

In the automated valet parking system according to the aspect of the disclosure, the failed vehicle may be a subsequent failed vehicle that the self-driving vehicle other than the subject vehicle stops in an emergency or experiences a communication interruption and becomes a failed vehicle while the automated parking of the subject vehicle is being performed, the restricted area setting unit may be configured to set a subsequent restricted area that is the restricted area based on the parking place map information and a position of the subsequent failed vehicle and set the allowed area including a parking space or parking spaces located outside the subsequent restricted area, and the vehicle instruction unit may be configured to, when the target route of the subject vehicle before occurrence of the subsequent failed vehicle passes through the subsequent restricted area, reset the target route such that the subject vehicle parks in the parking space located in the allowed area set according to occurrence of the subsequent failed vehicle. In this case, even when there occurs a subsequent failed vehicle while automated parking of the subject vehicle is being performed, the influence of the failed vehicle on the subject vehicle is reduced.

The automated valet parking system according to the aspect of the disclosure may further include a priority setting unit configured to calculate a priority of each parking space in the allowed area based on a distance from a position of the failed vehicle, and the vehicle instruction unit may be configured to, for an entry subject vehicle that is the subject vehicle serving as a subject of an entry request, set the target route of the subject vehicle such that the subject vehicle parks in the parking space of which the priority is the highest in the allowed area. In this case, by using a priority for a distance from a position of the failed vehicle, the influence of the failed vehicle on the subject vehicle is further reduced.

The automated valet parking system according to the aspect of the disclosure may further include a priority setting unit configured to calculate a priority of each parking space in the allowed area based on a type of failure of the failed vehicle, and the vehicle instruction unit may be configured to, for an entry subject vehicle that is the subject vehicle serving as a subject of an entry request, set the target route of the subject vehicle such that the subject vehicle parks in the parking space of which the priority is the highest in the allowed area. In this case, by using a priority for a type of failure of the failed vehicle, the influence of the failed vehicle on the subject vehicle is further reduced.

With the automated valet parking system according to the aspect of the disclosure, in comparison with a case where automated parking of the subject vehicle is performed without consideration of the failed vehicle, the influence of the failed vehicle on the subject vehicle suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart that shows an example of a vehicle abnormality notification process in a self-driving vehicle;

FIG. 11 is a flowchart that shows an example of a target route setting process in a parking place management server;

FIG. 12 is a flowchart that shows an example of a target route setting process caused by communication interruption in the parking place management server;

DETAILED DESCRIPTION

Hereinafter, an embodiment of the disclosure will be described with reference to the accompanying drawings.

Figure 1:
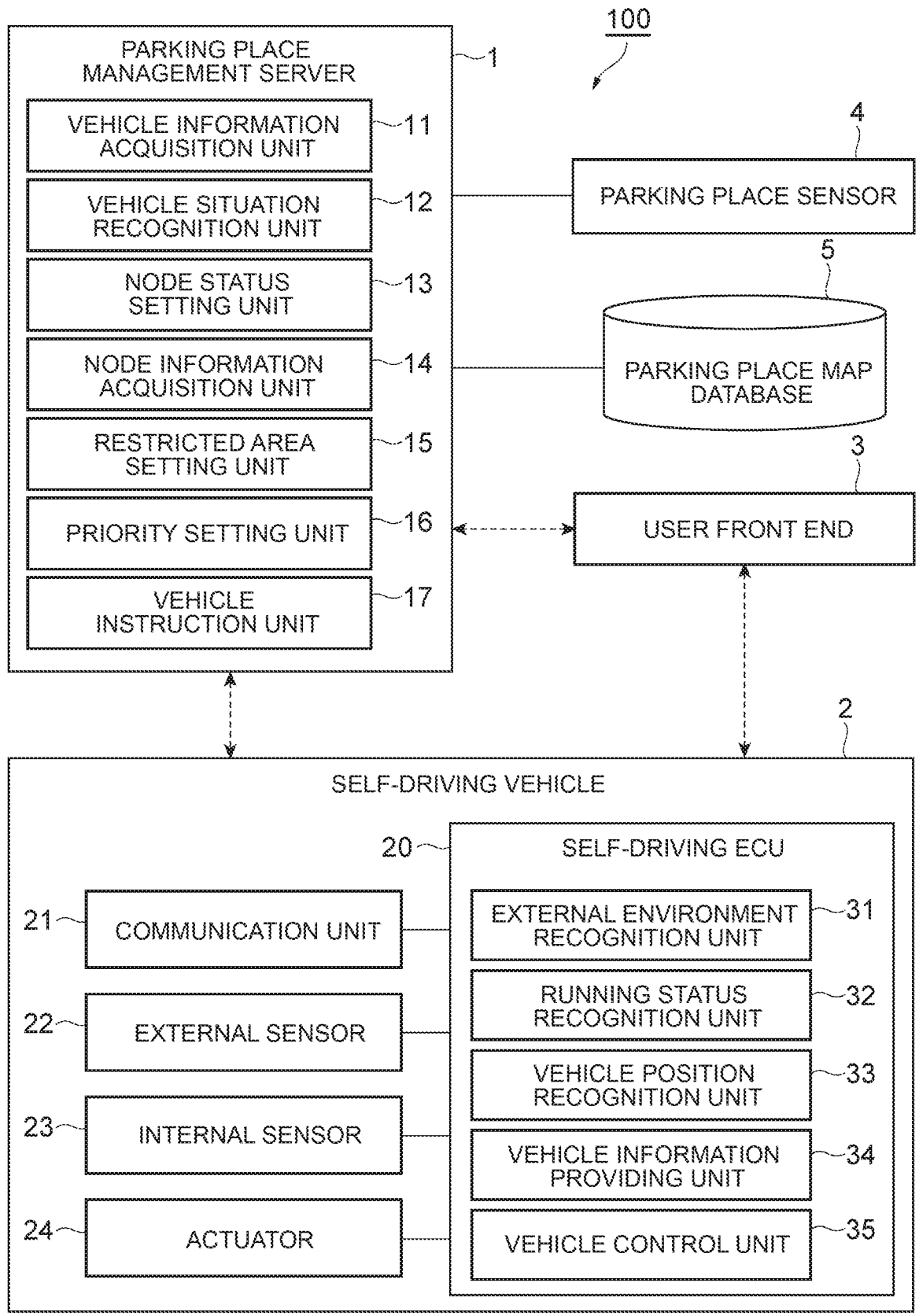
FIG. 1 is a block diagram that shows an automated valet parking system according to an embodiment.

FIG. 1 is a block diagram that shows an automated valet parking system 100 according to the embodiment. The automated valet parking system (AVPS) 100 shown in FIG. 1 is a system for performing automated valet parking of a plurality of self-driving vehicles 2 in a parking place.

Automated valet parking is the service of causing an unmanned self-driving vehicle 2 from which a user (occupant) gets off at a drop-off area in the parking place to run along a target route in accordance with an instruction from a parking place side and automatically park in a target parking space in the parking place. The target parking space is a parking space set in advance as a parking position of a self-driving vehicle 2. The target route is a route in the parking place, along which a self-driving vehicle 2 runs to reach the target parking space. A target route at the time of pick-up is a route along which a self-driving vehicle 2 runs to reach a pick-up space (described later). In other words, the automated valet parking system 100 performs automated parking in response to a user request for entry or pick-up from a user of an associated one of the self-driving vehicles 2 and causes the associated one of the self-driving vehicles 2 to perform automated driving along a target route to enter or pick up.

The parking place may be a parking place dedicated for automated valet parking or may also be used as a parking place for public vehicles that are not intended for automated valet parking. Part of the parking place for public vehicles may be used as an area dedicated for automated valet parking. In the present embodiment, a parking place dedicated for automated valet parking will be described as an example.

Figure 2:
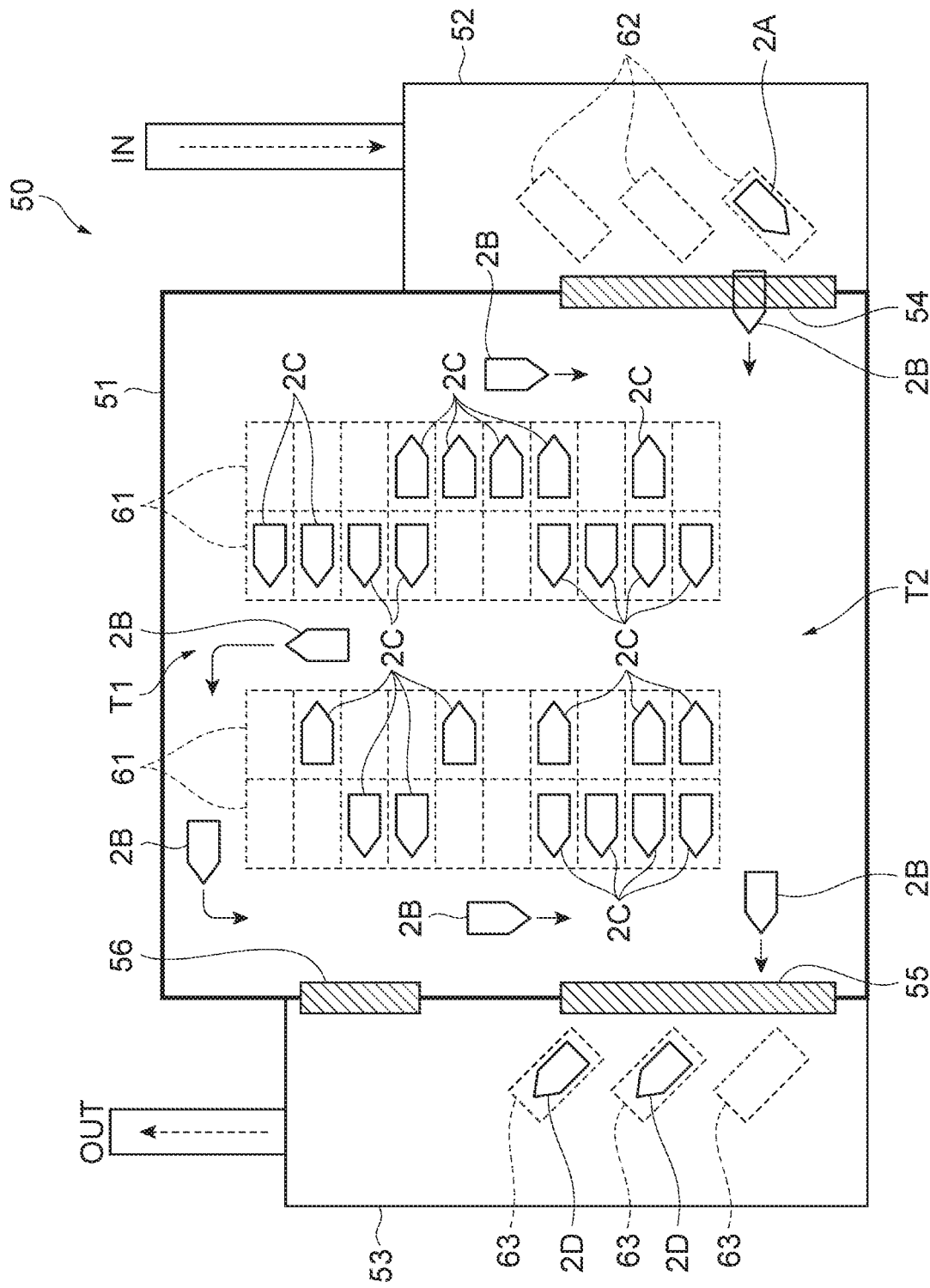
FIG. 2 is a plan view that shows an example of a parking place where automated valet parking is performed.

FIG. 2 is a plan view that shows an example of a parking place where automated valet parking is performed. FIG. 2 shows a parking place 50 for automated valet parking, a parking area 51, a drop-off area 52, and a pick-up area 53. The parking place 50 includes the parking area 51, the drop-off area 52, and the pick-up area 53. The drop-off area 52 and the pick-up area 53 do not need to be separately provided and may be provided as an integrated pick-up and drop-off area.

The parking area 51 is a place where parking spaces (parking slots) 61 in which the self-driving vehicles 2 park by means of automated valet parking. A plurality of the parking spaces 61 is arranged in one direction (for example, a vehicle width direction of parked vehicles), for example, as shown in FIG. 2. Crossroad positions T1, T2 are indicated in the parking area 51. Crossroad positions are positions where a plurality of driving passages intersects with each other.

The drop-off area 52 is provided near the entrance of the parking place 50 and is a place where occupants including users get off from self-driving vehicles 2 before entry. Drop-off spaces 62 for self-driving vehicles 2 to stop when occupants get off are provided in the drop-off area 52. The drop-off spaces 62 also serve as parking spaces for self-driving vehicles 2. The drop-off area 52 communicates with the parking area 51 via an entrance gate 54.

The pick-up area 53 is provided near the pick-up of the parking place 50 and is a place where occupants get on self-driving vehicles 2 coming out of the parking place 50. Pick-up spaces 63 for self-driving vehicles 2 to wait for occupants to get on are provided in the pick-up area 53. The pick-up spaces 63 also serve as parking spaces for self-driving vehicles 2. The pick-up area 53 communicates with the parking area 51 via a pick-up gate 55. A return gate 56 for causing self-driving vehicles 2 to return from the pick-up area 53 to the parking area 51 is provided between the pick-up area 53 and the parking area 51. The return gate 56 is not indispensable.

In FIG. 2, a self-driving vehicle 2A stopped in the drop-off space 62 of the drop-off area 52, self-driving vehicles 2B running in the parking place 50, self-driving vehicles 2C parked in the parking spaces 61 of the parking area 51, and self-driving vehicles 2D stopped in the pick-up spaces 63 of the pick-up area 53 are shown.

The automated valet parking system 100, for example, after the self-driving vehicle 2 entering the parking place 50 drops off an occupant(s) in the drop-off space 62 (which corresponds to the self-driving vehicle 2A), obtains authorization to provide an instruction to the self-driving vehicle 2 and starts automated valet parking. The automated valet parking system 100 causes the self-driving vehicle 2 to run toward a target parking space in the parking area 51 (which corresponds to the self-driving vehicle 2B) and parks the self-driving vehicle 2 in the target parking space (which corresponds to the self-driving vehicle 2C). The automated valet parking system 100 causes the parked self-driving vehicle 2 to run toward the pick-up area 53 in response to a pick-up request and wait in the pick-up space 63 until an occupant(s) arrive/arrives (which corresponds to the self-driving vehicle 2D).

When at least any one of the self-driving vehicles 2 stops in an emergency or experiences communication interruption and becomes a failed vehicle during automated valet parking, the automated valet parking system 100 sets a restricted area and an allowed area based on parking place map information and a position of the failed vehicle, and sets a target route of a subject vehicle such that the subject vehicle parks in a parking space located in the allowed area. The failed vehicle, the subject vehicle, the restricted area, and the allowed area will be described in detail later.

Configuration of Automated Valet Parking System

Hereinafter, the configuration of the automated valet parking system 100 will be described with reference to the accompanying drawings. As shown in FIG. 1, the automated valet parking system 100 includes a parking place management server 1. The parking place management server 1 is a server for managing the parking place.

The parking place management server 1 is configured to be communicable with the self-driving vehicles 2 and user front ends 3. The self-driving vehicles 2 and the user front ends 3 will be described in detail later. The parking place management server 1 may be provided in the parking place or may be provided in a facility remote from the parking place. The parking place management server 1 may be made up of a plurality of computers respectively provided in different places.

The parking place management server 1 is connected to a parking place sensor 4 and a parking place map database 5. The parking place sensor 4 is a parking place facility sensor (infrastructure sensor) for recognizing a situation in the parking place 50. The parking place sensor 4 includes an empty sensor for detecting whether a parked vehicle is present in each parking space (whether each parking space is occupied or empty).

The empty sensor may be provided for each parking space or the single empty sensor may be provided on a ceiling, or the like, and configured to be able to monitor a plurality of parking spaces. The configuration of each empty sensor is not limited, and a known configuration may be employed. The empty sensor may be a pressure sensor or may be a radar sensor or sonar sensor using radio waves or may be a camera. The empty sensor sends detected information of a parked vehicle in a parking space to the parking place management server 1.

The parking place sensor 4 may include a monitoring camera for detecting a self-driving vehicle 2 that runs on the driving passage of the parking place 50. The monitoring camera is provided on a ceiling or wall of the parking place and captures the image of a running self-driving vehicle 2. The monitoring camera sends a captured image to the parking place management server 1.

The parking place map database 5 is a database that stores the parking place map information. The parking place map information contains position information of parking spaces in the parking place, position information of the drop-off spaces, position information of the pick-up spaces, and information of the driving passages in the parking place. The parking place map information also contains node position information of a plurality of nodes set in advance in correspondence with a plurality of passages in the parking place.

The parking place map information contains position information of a plurality of nodes set in advance in correspondence with a plurality of passages in the parking place 50. As an example, the plurality of nodes is set along imaginary center lines of the plurality of passages in the parking place 50 (see the dashed circles in FIG. 4 to FIG. 6). For example, when the entrance part of the border of each parking space 61 faces the straight section of a passage, a node is set in front of the parking space 61. Alternatively, a node may be set on a border line corresponding to the entrance part of the border of the parking space 61.

Curve sections of the passages each are defined by nodes at end points of straight sections adjacent to each other so as to sandwich the curve section (end points closer to the curve section). For example, a pair of nodes (nodes each correspond to the starting point or end point of a curve) that are end points of a curve section of a passage may overlap the nodes of the end points of straight sections adjacent to each other. In a curve section of the passage, the above-described imaginary center line may be assumed as a curve connecting these nodes. These nodes are used by the self-driving vehicles 2 to perform automated driving in the parking place 50.

Figure 3:
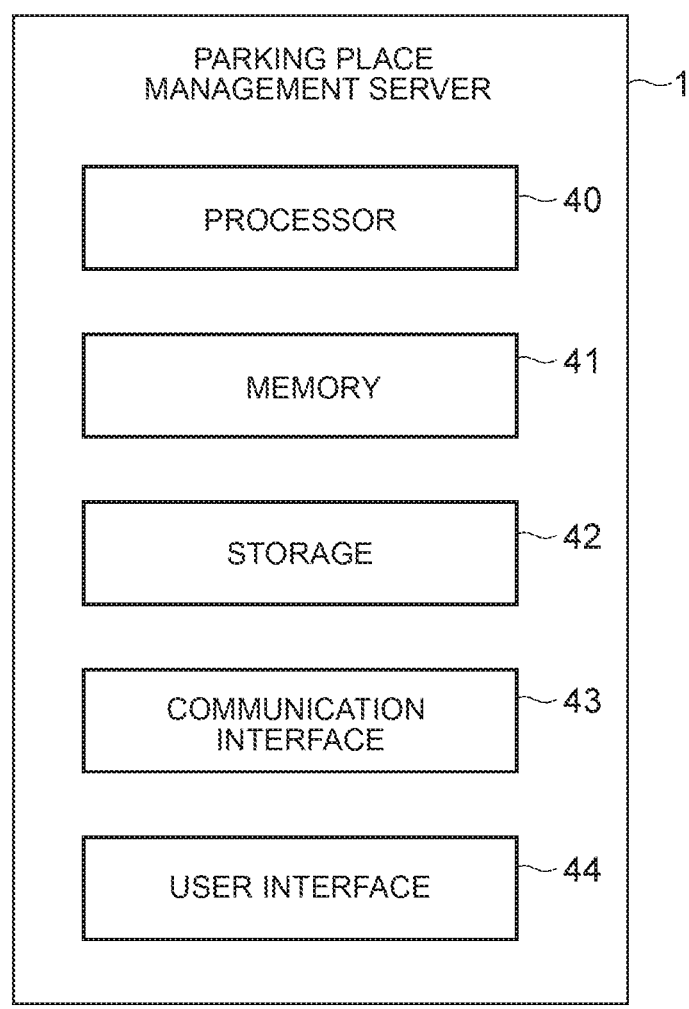
FIG. 3 is a block diagram that shows an example of the hardware configuration of a parking place management server.

The hardware configuration of the parking place management server 1 will be described. FIG. 3 is a block diagram that shows an example of the hardware configuration of the parking place management server. As shown in FIG. 3, the parking place management server 1 is configured as a general computer including a processor 40, a memory 41, a storage 42, a communication interface 43, and a user interface 44.

The processor 40 controls the parking place management server 1 by running various operating systems. The processor 40 is a computing unit, such as a central processing unit (CPU) including a controller, an arithmetic unit, a register, and the like. The processor 40 overall controls the memory 41, the storage 42, the communication interface 43, and the user interface 44. The memory 41 is a storage medium, such as a read only memory (ROM) and a random access memory (RAM). The storage 42 is a storage medium, such as a hard disk drive (HDD).

The communication interface 43 is a communication device for performing wireless communication via a network. A network device, a network controller, a network card, or the like, may be used as the communication interface 43. The parking place management server 1 communicates with the self-driving vehicles 2 and the user front ends 3 by using the communication interface 43. The user interface 44 is an input/output unit of the parking place management server 1 for an administrator, or the like, of the parking place management server 1. The user interface 44 includes an output device, such as a display and a speaker, and an input device, such as a touch panel.

Next, the functional configuration of the parking place management server 1 will be described. As shown in FIG. 1, the parking place management server 1 includes a vehicle information acquisition unit 11, a vehicle situation recognition unit 12, a node status setting unit 13, a node information acquisition unit 14, a restricted area setting unit 15, a priority setting unit 16, and a vehicle instruction unit 17.

The vehicle information acquisition unit 11 acquires vehicle information of a self-driving vehicle 2 that is a subject of automated valet parking by communicating with the self-driving vehicle 2. The vehicle information contains the identification information of the self-driving vehicle 2, and the position information of the self-driving vehicle 2 in a parking place map. Identification information may be information by which each individual self-driving vehicle 2 is identified. Identification information may be an identification number (ID number), may be a vehicle number, or may be a reservation number, or the like, of automated valet parking.

Vehicle information may contain the vehicle model of a self-driving vehicle 2 or may contain a vehicle number in addition to identification information. Vehicle information may contain entry reservation information, such as reserved entry time, or may contain scheduled pick-up time. Vehicle information may contain vehicle body information, such as the turning radius, overall length, and vehicle width of a self-driving vehicle 2, or may contain information on the automated driving function of a self-driving vehicle 2. Information on the automated driving function may contain version information of automated driving.

Vehicle information may contain a recognized running status and external environment of a self-driving vehicle 2. Recognition of a running status and external environment will be described later. Vehicle information may contain information on a remaining range or remaining fuel of a self-driving vehicle 2. Vehicle information may contain failure information of a self-driving vehicle 2. Failure information is information on a vehicle abnormality that has occurred in a self-driving vehicle 2.

Failure information may contain information on the cause of a vehicle abnormality of a self-driving vehicle 2. The cause of a vehicle abnormality includes at least one of a power supply failure, brake failure, steering failure, accelerator failure, external sensor failure, internal sensor failure, electronic control unit (ECU) failure, controller area network (CAN) failure, and shift failure of a self-driving vehicle 2.

A power supply failure includes a failure of a main power supply. A power supply failure may include a failure of a second power supply (a failure of a second power supply alone). A brake failure includes a failure of a main brake. A brake failure may include a failure of a redundant brake. An external sensor failure includes at least one of a camera failure, a sonar sensor failure, and a radar sensor failure. When at least any one of a side mirror abnormality and a headlight abnormality influences marker recognition, the abnormality may be included in an external sensor failure. An internal sensor failure includes at least one of a vehicle speed sensor failure, an acceleration sensor failure, and a yaw rate sensor failure. An ECU failure includes at least one of a function failure on the automated driving function, a function failure on a clearance sonar, and a function failure on the camera. A shift failure includes a failure of a main shift. A shift failure may include a failure of a redundant shift.

Failure information does not need to include information on a failure that does not influence continuation of automated valet parking. Failure information does not necessarily include information on the cause of a vehicle abnormality and may include only information on the status of a self-driving vehicle 2, such as a state where a self-driving vehicle 2 is not able to run by means of automated driving.

The vehicle information acquisition unit 11 continuously acquires vehicle information from the self-driving vehicle 2 during automated valet parking. The vehicle information acquisition unit 11 may continuously acquire vehicle information from a specified self-driving vehicle 2 during automated driving in response to an instruction (hereinafter, referred to as subject vehicle 2) during automated valet parking. When a self-driving vehicle 2 different from the subject vehicle 2 is performing automated driving in response to an instruction, the vehicle information acquisition unit 11 may continuously acquire vehicle information from the different self-driving vehicle 2. When the subject vehicle 2 and/or the self-driving vehicle 2 is parked, the vehicle information acquisition unit 11 may stop acquiring vehicle information or may regularly acquire vehicle information. Hereinafter, when a "different self-driving vehicle 2" or "another self-driving vehicle 2" is referred to, the subject vehicle 2 is not included; whereas, when merely a "self-driving vehicle 2" is referred to, the subject vehicle 2 can be included.

The vehicle situation recognition unit 12 recognizes the situation of a self-driving vehicle(s) 2 during automated valet parking based on the vehicle information acquired by the vehicle information acquisition unit 11. The situation of the self-driving vehicle(s) 2 includes the positions of self-driving vehicles 2 during automated driving. The situation of the self-driving vehicle(s) 2 includes the position(s) of the self-driving vehicle(s) 2 that is/are a failed vehicle(s) and the position and target route of the subject vehicle 2. The situation of the self-driving vehicle(s) 2 includes a communication situation between the parking place management server 1 and each self-driving vehicle 2. The vehicle situation recognition unit 12 may recognize the situation of the self-driving vehicle(s) 2 based on a captured image(s) of the self-driving vehicle(s) 2, sent from the parking place sensor 4.

The vehicle situation recognition unit 12 determines whether a vehicle abnormality has occurred in the self-driving vehicle(s) 2 during automated valet parking based on the vehicle information acquired by the vehicle information acquisition unit 11. A vehicle abnormality means an abnormality that influences continuation of automated valet parking. A vehicle abnormality includes a vehicle abnormality related to running of automated driving and a vehicle abnormality related to parking of automated driving.

A vehicle abnormality related to running of automated driving is an abnormality that causes a self-driving vehicle 2 to fail to stop, fail to turn, fail to run, or fail to control running. A vehicle abnormality that causes a self-driving vehicle 2 to fail to stop includes a power supply failure and brake failure of the self-driving vehicle 2. A vehicle abnormality that causes a self-driving vehicle 2 to fail to turn includes a steering failure of the self-driving vehicle 2. A vehicle abnormality that causes a self-driving vehicle 2 to fail to run includes an accelerator failure. A vehicle abnormality that causes a self-driving vehicle 2 to fail to control running includes an external sensor failure, an internal sensor failure, an ECU failure, and a CAN failure. A vehicle abnormality related to running of automated driving does not need to include failures that do not influence running of automated driving.

The vehicle abnormality related to parking of automated driving is an abnormality that causes a self-driving vehicle 2 not to be able to park in a parking space with appropriate accuracy because of a failure of a sensor, or the like. A vehicle abnormality related to parking of automated driving includes at least one of an external sensor failure, an internal sensor failure, and a shift failure. For example, in a self-driving vehicle 2 that requires a sonar sensor in parking of automated driving, when a sonar sensor failure occurs, it is determined that there is a vehicle abnormality related to parking of automated driving. A vehicle abnormality related to parking of automated driving does not need to include failures that do not influence parking of automated driving.

When a self-driving vehicle 2 recognizes a vehicle abnormality, the self-driving vehicle 2 stops in an emergency and provides the parking place management server 1 with vehicle information containing failure information on the vehicle abnormality. When the self-driving vehicle 2 fails to stop, the self-driving vehicle 2 stops in an emergency by, for example, stopping supply of driving force to wheels. The self-driving vehicle 2 stops or retreat in accordance with an instruction from the parking place management server 1.

The vehicle situation recognition unit 12 may determine occurrence of a vehicle abnormality not recognized by a self-driving vehicle 2. For example, when a set time has elapsed while a self-driving vehicle 2 remains stopped although the vehicle instruction unit 17 (described later) has sent an instruction to move forward based on information on the running status of the self-driving vehicle 2 (for example, vehicle speed information), included in vehicle information, the vehicle situation recognition unit 12 may determine that a vehicle abnormality has occurred in the self-driving vehicle 2 during automated valet parking.

When the position of a self-driving vehicle 2, estimated based on a detected result (for example, a captured image of the self-driving vehicle 2) of the parking place sensor 4, and the position of the self-driving vehicle 2 in vehicle information sent from the self-driving vehicle 2 are located a set distance or longer away from each other, the vehicle situation recognition unit 12 may determine that a vehicle abnormality has occurred in the self-driving vehicle 2.

When the difference between the vehicle speed of a self-driving vehicle 2, estimated based on a detected result of the parking place sensor 4, and the vehicle speed of the self-driving vehicle 2 in vehicle information sent from the self-driving vehicle 2 is greater than or equal to a vehicle speed threshold, the vehicle situation recognition unit 12 may determine that a vehicle abnormality has occurred in the self-driving vehicle 2. The vehicle speed threshold is a threshold set in advance. An acceleration may be used instead of a vehicle speed. The vehicle situation recognition unit 12 may determine that a vehicle abnormality has occurred in a self-driving vehicle 2 by comparing the orientation of the self-driving vehicle 2, estimated based on a detected result of the parking place sensor 4, with a steering angle in the vehicle information.

When the vehicle situation recognition unit 12 recognizes that a self-driving vehicle 2 has departed from a target route based on a detected result of the parking place sensor 4 or vehicle information sent from the self-driving vehicle 2, the vehicle situation recognition unit 12 may determine that a vehicle abnormality has occurred in the self-driving vehicle 2. When the difference between a target steering angle provided by an instruction from the vehicle instruction unit 17 (described later) and a steering angle (actual steering angle) of a self-driving vehicle 2 in vehicle information sent from the self-driving vehicle 2 is greater than or equal to a steering angle instruction threshold, the vehicle situation recognition unit 12 may determine that a vehicle abnormality has occurred in the self-driving vehicle 2. The steering angle instruction threshold is a threshold set in advance. A vehicle speed or an acceleration may be used instead of a steering angle. When the vehicle situation recognition unit 12 determines that a vehicle abnormality has occurred, the vehicle situation recognition unit 12 recognizes that the self-driving vehicle 2 has become a failed vehicle because of the vehicle abnormality.

The vehicle situation recognition unit 12 determines whether there occurs communication interruption between the parking place management server 1 and a self-driving vehicle 2. A method of determining communication interruption is not limited, and a known technique may be used. For example, when the duration of a situation in which communication with a self-driving vehicle 2 is disabled is longer than or equal to a set time, the vehicle situation recognition unit 12 determines that there occurs communication interruption. When the duration of a state where a communication speed with a self-driving vehicle 2 is lower than an interruption determination threshold is longer than or equal to a set time, the vehicle situation recognition unit 12 may determine that communication interruption has occurred. The interruption determination threshold is a threshold set in advance. When the vehicle situation recognition unit 12 determines that communication interruption has occurred, the vehicle situation recognition unit 12 recognizes that the self-driving vehicle 2 has become a failed vehicle because of the vehicle abnormality.

A failed vehicle is a vehicle placed in a state where the vehicle is not able to continue automated valet parking because of a vehicle abnormality or communication interruption. Here, the failed vehicle means the self-driving vehicle 2 other than the subject vehicle 2. The subject vehicle 2 is able to run along with an instruction from the parking place management server 1 and is the self-driving vehicle 2 in which no failure is occurring. A failed vehicle includes a subsequent failed vehicle that the self-driving vehicle 2 other than the subject vehicle 2 stops in an emergency or experiences communication interruption and becomes a failed vehicle while automated parking of the subject vehicle 2 is being performed.

The node status setting unit 13 sets node statuses based on the positions of the self-driving vehicles 2 in the parking place 50. Node statuses include information on whether a node is allowed to be passed (a node passage allowed status and a node passage prohibited status). The self-driving vehicles 2 are able to pass nodes in the passage allowed node status. The self-driving vehicles 2 are not able to pass nodes in the node passage prohibited status.

Whether a node is allowed to be passed may be determined based on the position information of the self-driving vehicle(s) 2 other than the subject vehicle 2. Whether a node is allowed to be passed may be determined based on the target route(s) of the self-driving vehicle(s) 2 other than the subject vehicle 2. Whether a node is allowed to be passed may be determined further based on the position information of a pedestrian in the parking place 50. Whether a node is allowed to be passed may be determined based on a schedule of automated valet parking to be performed by the parking place management server 1.

The node status setting unit 13 sets node statuses according to occurrence of a failed vehicle based on the parking place map information stored in the parking place map database 5 and a recognized result of the vehicle situation recognition unit 12. For example, when the vehicle situation recognition unit 12 recognizes that a failed vehicle has occurred because of a vehicle abnormality or communication interruption, the node status setting unit 13 sets node statuses around the position of the failed vehicle to the node passage prohibited status based on the position of the failed vehicle and the positions of the nodes. The position of a failed vehicle is the position of a failed vehicle in the parking place, which is recognized based on vehicle information sent from the self-driving vehicle 2 (failed vehicle) when a failure (vehicle abnormality or communication interruption) occurs or just before the failure.

When the vehicle situation recognition unit 12 recognizes that a failed vehicle has occurred because of a vehicle abnormality or communication interruption, the node information acquisition unit 14 acquires the above-described node statuses as node information. The acquired node statuses are used in the restricted area setting unit 15 (described later).

When a self-driving vehicle 2 stops in an emergency or experiences communication interruption and becomes a failed vehicle, the restricted area setting unit 15 sets a restricted area that is an area in the parking space, in which automated parking of a self-driving vehicle(s) 2, other than the failed vehicle, is restricted, based on the parking place map information and the position of the failed vehicle. The restricted area setting unit 15 also sets an allowed area in the parking place including parking spaces located outside the restricted area. An allowed area means a parking space(s) where automated parking of a self-driving vehicle(s) 2 other than a failed vehicle is not blocked by the failed vehicle. Here, parking spaces not only include the parking spaces 61 but also may include at least the drop-off spaces 62 or the pick-up spaces 63 (see FIG. 2).

The restricted area setting unit 15 sets a subsequent restricted area that is a restricted area based on the parking place map information and the position of a subsequent failed vehicle. For example, before a start of automated parking of the subject vehicle 2, when another one of the self-driving vehicles 2 stops in an emergency or experiences communication interruption and becomes a subsequent failed vehicle, the restricted area setting unit 15 sets a subsequent restricted area based on the parking place map information and the position of the subsequent failed vehicle. The restricted area setting unit 15 sets an allowed area including parking spaces located outside the subsequent restricted area according to occurrence of the subsequent failed vehicle.

The restricted area setting unit 15, for example, sets parking spaces where automated parking of a self-driving vehicle(s) 2 other than a failed vehicle is blocked by the failed vehicle as a restricted area. Parking spaces where automated parking is blocked include parking spaces of which the entrance part is directly blocked by the presence of a failed vehicle. Parking spaces where automated parking is blocked include parking spaces of which the entrance part is not directly blocked by the presence of a failed vehicle but automated parking is substantially blocked when steering is turned right and left (the head is turned) for entering a parking space. Parking spaces where automated parking is substantially blocked may be, for example, one or plurality of parking spaces adjacent to a parking space or parking spaces of which the entrance part is directly blocked.

The restricted area setting unit 15, for example, recognizes parking spaces associated with the nodes set to the node passage prohibited status by the node status setting unit 13 in response to occurrence of a failed vehicle as parking spaces of which the entrance part is directly blocked, and sets the parking spaces as a restricted area.

For example, for parking spaces associated with nodes not set to the passage prohibited node status by the node status setting unit 13 according to occurrence of a failed vehicle, the restricted area setting unit 15 may recognize one or plurality of parking spaces adjacent to a parking space associated with nodes set to the node passage prohibited status as parking spaces to which automated parking is substantially blocked, and may set the parking spaces as a restricted area.

Figure 4:
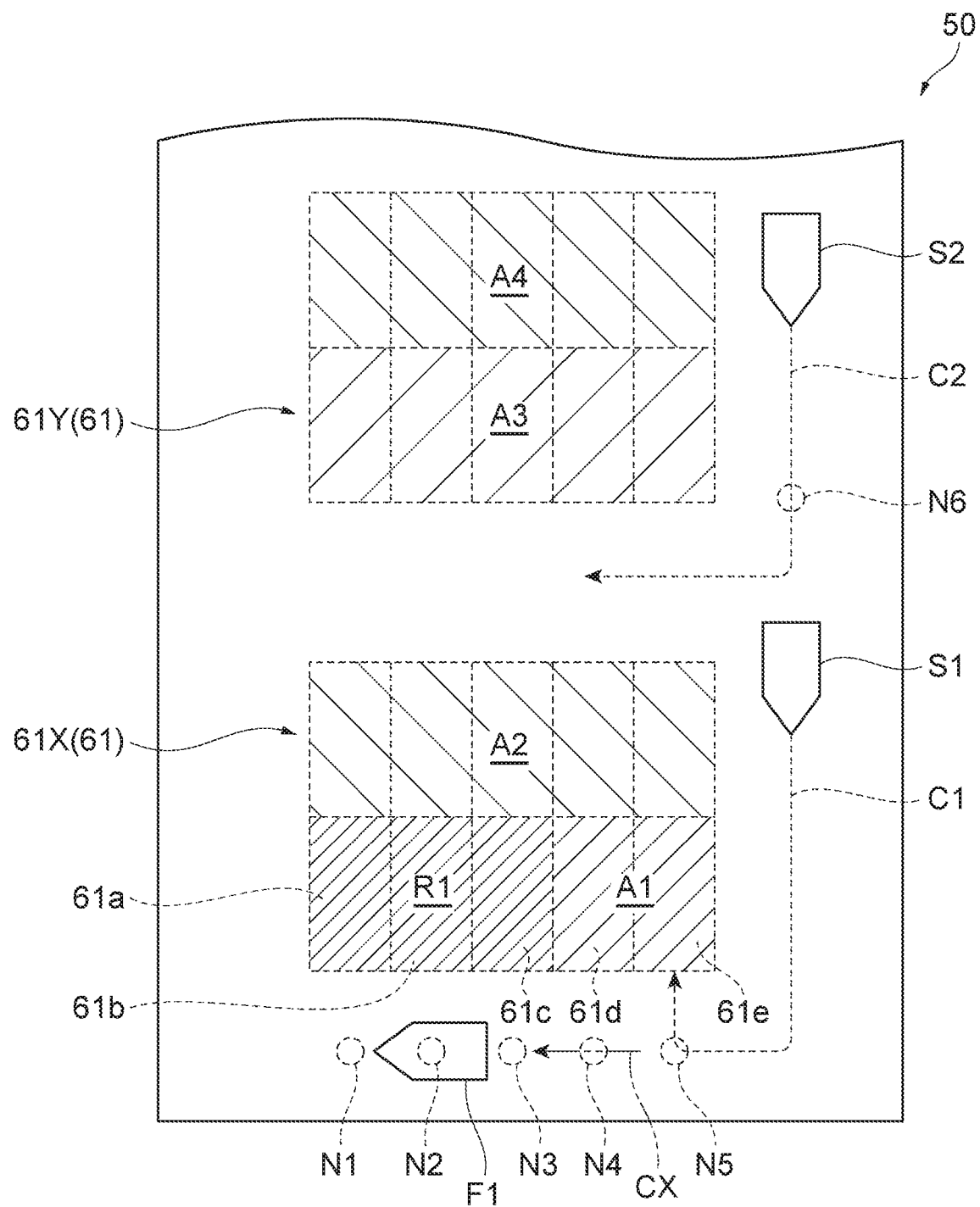
FIG. 4 is a plan view for illustrating an example of settings of a restricted area and an allowed area.

FIG. 4 is a plan view for illustrating an example of settings of a restricted area and an allowed area. FIG. 4 shows the parking place 50, the parking spaces 61, a failed vehicle F1, a subject vehicle S1, a subject vehicle S2, a restricted area R1, allowed areas A1, A2, A3, A4, nodes N1, N2, N3, N4, N5, N6, a target route C1 of the subject vehicle S1, and a target route C2 of the subject vehicle S2. In FIG. 4, for the sake of convenience of description, as compared to the parking place 50 in FIG. 2, the number, arrangement, and the like, of the parking spaces 61 are changed. In the present embodiment, description will be made on the assumption that automated parking of self-driving vehicles 2 is performed in such an orientation that the self-driving vehicles 2 reverse to enter parking spaces. Automated parking of self-driving vehicles 2 may be performed in such an orientation that the self-driving vehicles 2 move forward to enter parking spaces.

In the situation shown in FIG. 4, the restricted area setting unit 15, for example, sets the restricted area R1 to parking spaces where automated parking of the self-driving vehicles 2 other than the failed vehicle F1 is blocked by the failed vehicle F1. In the example of FIG. 4, the restricted area R1 includes a parking space 61b associated with the node N2 where the failed vehicle F1 is located and parking spaces 61a, 61c associated with the pair of nodes N1, N3 adjacent to the node N2. The restricted area R1 may include these nodes N1, N2, N3.

In the situation shown in FIG. 4, the restricted area setting unit 15 sets the allowed areas A1, A2, A3, A4 including the parking spaces 61 other than the restricted area R1. The allowed area A1 is made up of parking spaces in the row same as the row of the parking spaces 61a, 61b, 61c of the restricted area R1. The parking spaces 61a, 61b, 61c of the restricted area R1 and the allowed area A1 are arranged side by side in the vehicle width direction of parked vehicles. In the disclosure, the "row" means the row of a plurality of parking spaces arranged in the vehicle width direction of parked vehicles.

The allowed areas A2, A3, A4 each are made up of parking spaces in a row different from the row of the parking spaces 61 a, 61 b, 61 c of the restricted area R1. The allowed area A2 of block 61X is in a row adjacent to the parking spaces 61 a, 61 b, 61 c of the restricted area R1 on a back side of parked vehicles in a front-rear direction. The allowed areas A3, A4 are in a block 61Y different from a block 61X in which the restricted area R1 is set. The allowed areas A3, A4 are respectively in rows adjacent to each other on back sides in the front-rear direction of parked vehicles.

Figure 5:
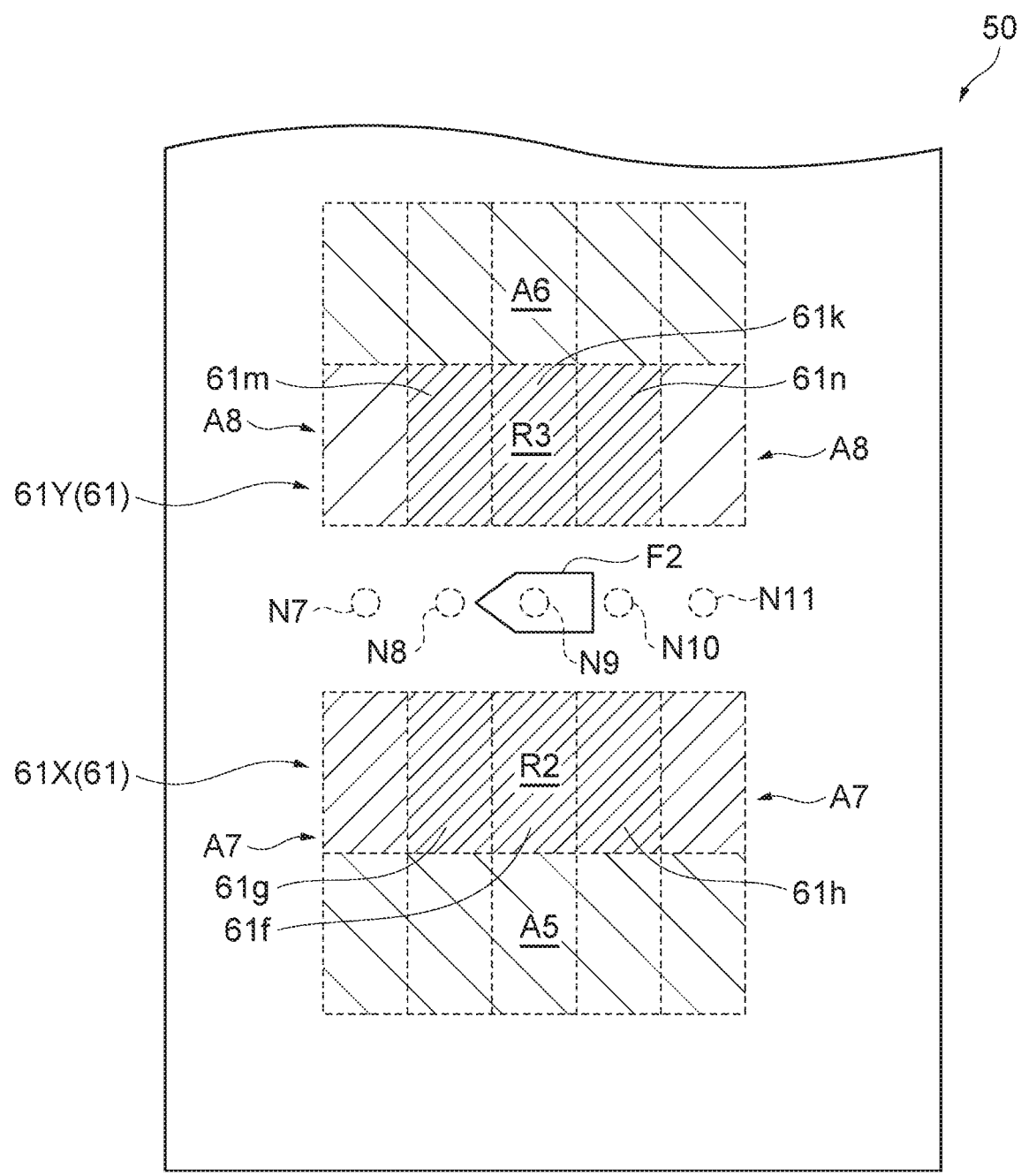
FIG. 5 is a plan view for illustrating another example of settings of a restricted area and an allowed area.
Figure 6:
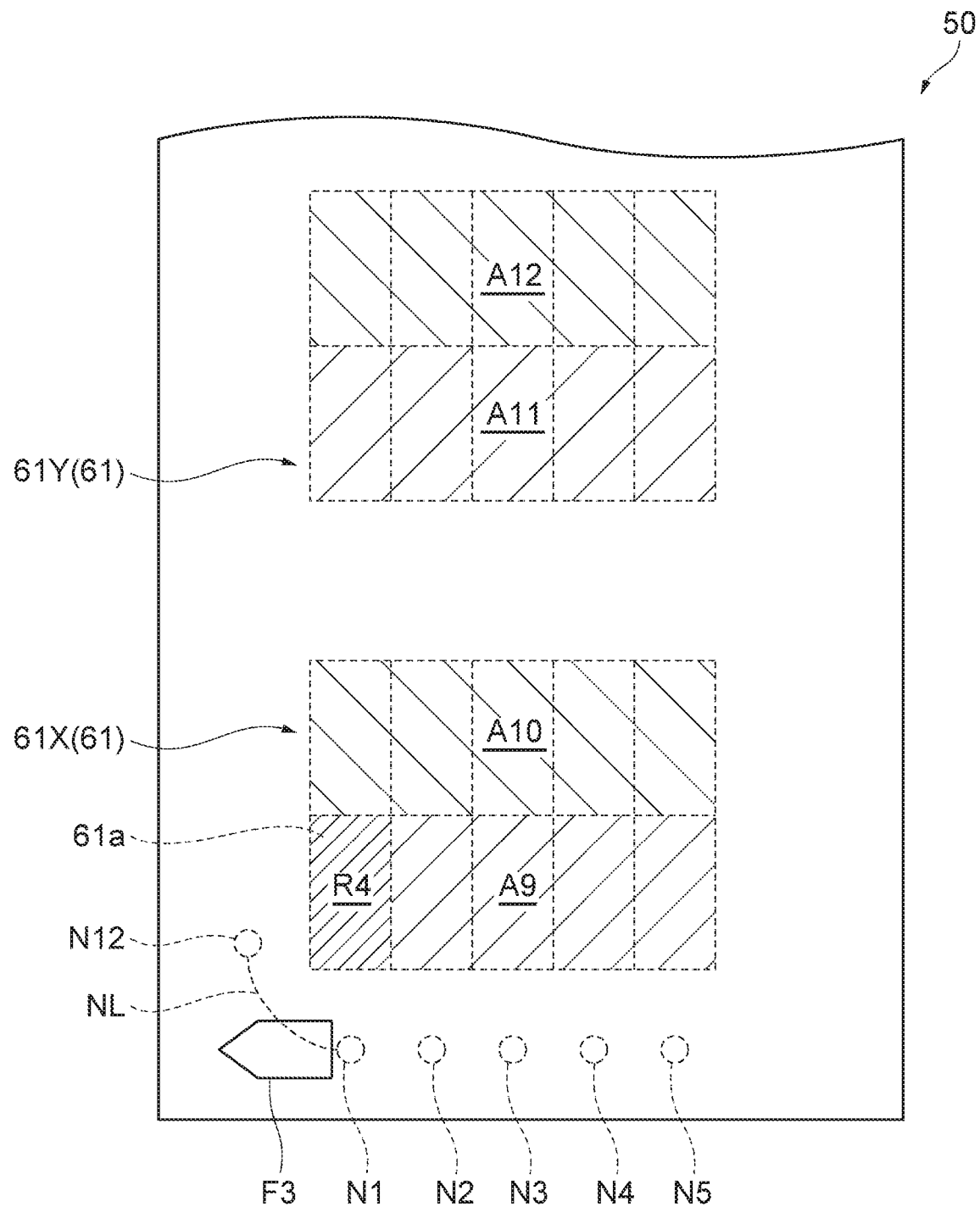
FIG. 6 is a plan view for illustrating another example of settings of a restricted area and an allowed area.

FIG. 5 and FIG. 6 are plan views for illustrating examples of settings of a restricted area and an allowed area. FIG. 5 shows a failed vehicle F2, restricted areas R2, R3, allowed areas A5, A6, A7, A8, and nodes N7, N8, N9, N10, N11. As well as FIG. 4, in FIG. 5 and FIG. 6, for the sake of convenience of description, as compared to the parking place 50 in FIG. 2, the number, arrangement, and the like, of the parking spaces 61 are changed.

In the situation shown in FIG. 5, the restricted area setting unit 15, for example, sets the restricted areas R2, R3 to parking spaces where automated parking of the self-driving vehicles 2 other than the failed vehicle F2 is blocked by the failed vehicle F2 located in the passage between the block 61X and the block 61Y. In the example of FIG. 5, the restricted area R2 includes a block 61X-side parking space 61f associated with the node N9 at which the failed vehicle F2 is located and parking spaces 61g, 61h adjacent to the parking space 61f. The restricted area R3 includes a block 61Y-side parking space 61k associated with the node N9 at which the failed vehicle F2 is located and a pair of parking spaces 61m, 61n adjacent to the parking space 61k. The restricted areas R2, R3 may include the nodes N8, N9, N10.

In the situation shown in FIG. 5, the restricted area setting unit 15 sets the allowed areas A5, A6, A7, A8 including the parking spaces 61 other than the restricted areas R2, R3. The allowed area A5 is made up of a plurality of parking spaces in a row different from the restricted area R2 in the block 61X. The allowed area A6 is made up of a plurality of parking spaces in a row different from the restricted area R3 in the block 61Y. The allowed area A7 is made up of parking spaces other than the restricted area R2 in the row same as the row of the restricted area R2 in the block 61X. The allowed area A8 is made up of parking spaces other than the restricted area R3 in the row same as the row of the restricted area R3 in the block 61Y.

FIG. 6 shows a failed vehicle F3, a restricted area R4, allowed areas A9, A10, A11, A12, and nodes N1, N2, N3, N4, N5, N12. In the situation shown in FIG. 6, the restricted area setting unit 15, for example, sets the restricted area R4 to parking spaces where automated parking of the self-driving vehicles 2 other than the failed vehicle F3 is blocked by the failed vehicle F3 having retreated to the passage located at a corner of the block 61X.

In the example of FIG. 6, the failed vehicle F3 is not located at either the node N1 or the node N12. In this case, since the failed vehicle F3 is located in a node section NL between the node N1 and the node N12, the nodes N1, N12 at both ends of the node section NL are set to the node passage prohibited status by the node status setting unit 13. The restricted area setting unit 15 recognizes the parking space 61a associated with the node N1 set to the node passage prohibited status as a parking space where automated parking is substantially blocked and sets the restricted area R4 to the parking space 61a.

In the situation shown in FIG. 6, the restricted area setting unit 15 sets the allowed areas A9, A10, A11, A12 including the parking spaces 61 other than the restricted areas R4. The allowed area A9 is made up of parking spaces other than the restricted area R4 in the row same as the row of the restricted area R4 in the block 61X. The allowed area A10 is made up of a plurality of parking spaces in a row different from the row of the restricted area R4 in the block 61X. The allowed areas A11, A12 are respectively made up of pluralities of parking spaces in rows different from each other in the block 61Y.

Figure 7A:
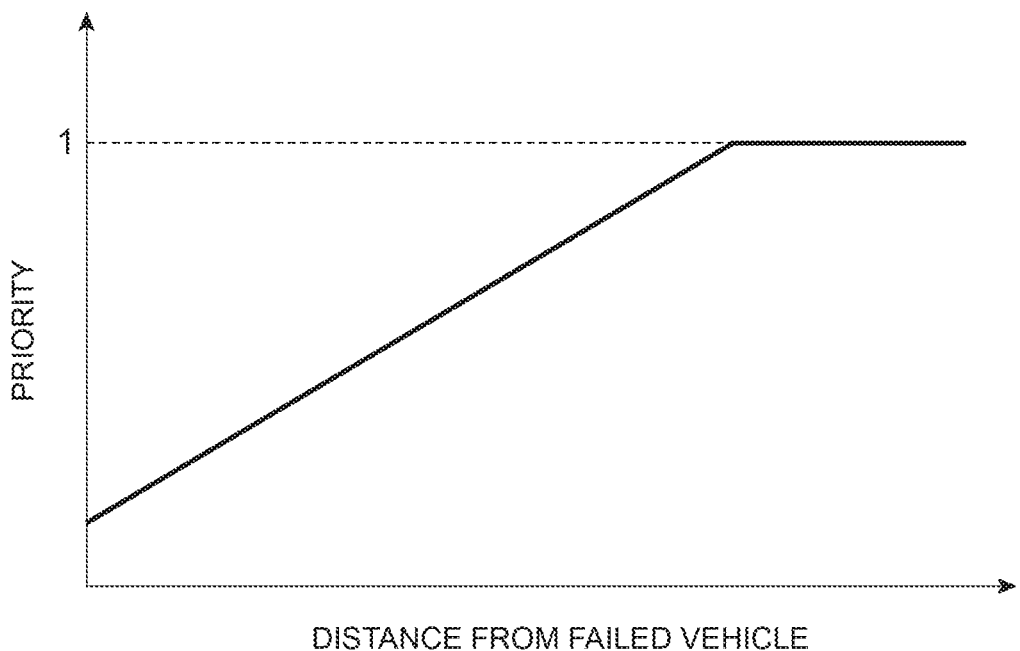
FIG. 7A is a graph for illustrating an example of settings of priorities for an allowed area in a row same as a row of a restricted area.
Figure 7B:
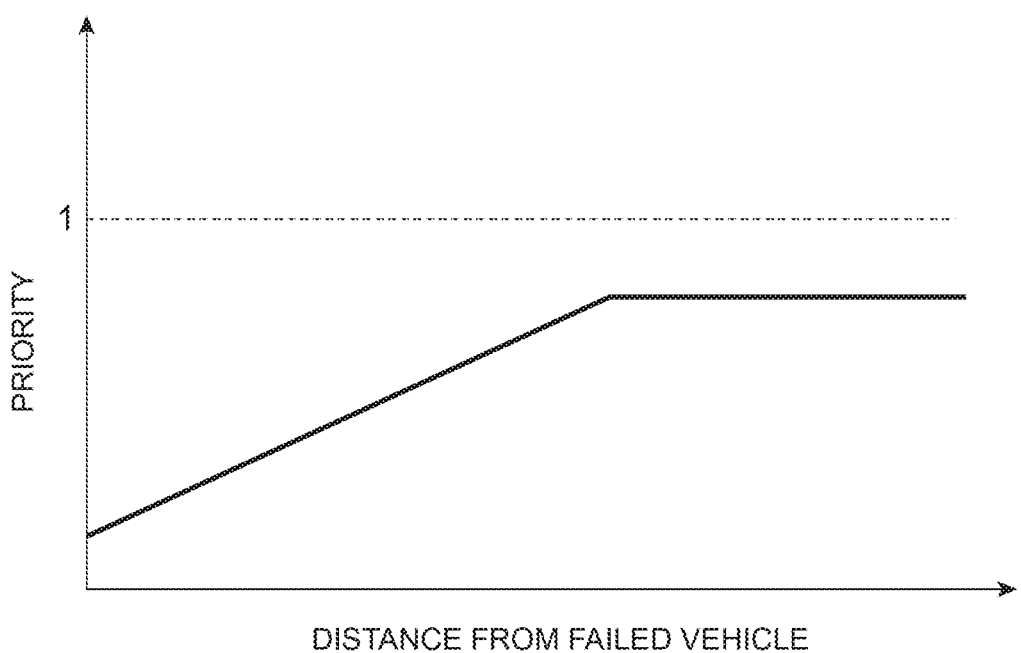
FIG. 7B is a graph for illustrating an example of settings of priorities for an allowed area in a row same as a row of a restricted area.
Figure 8:
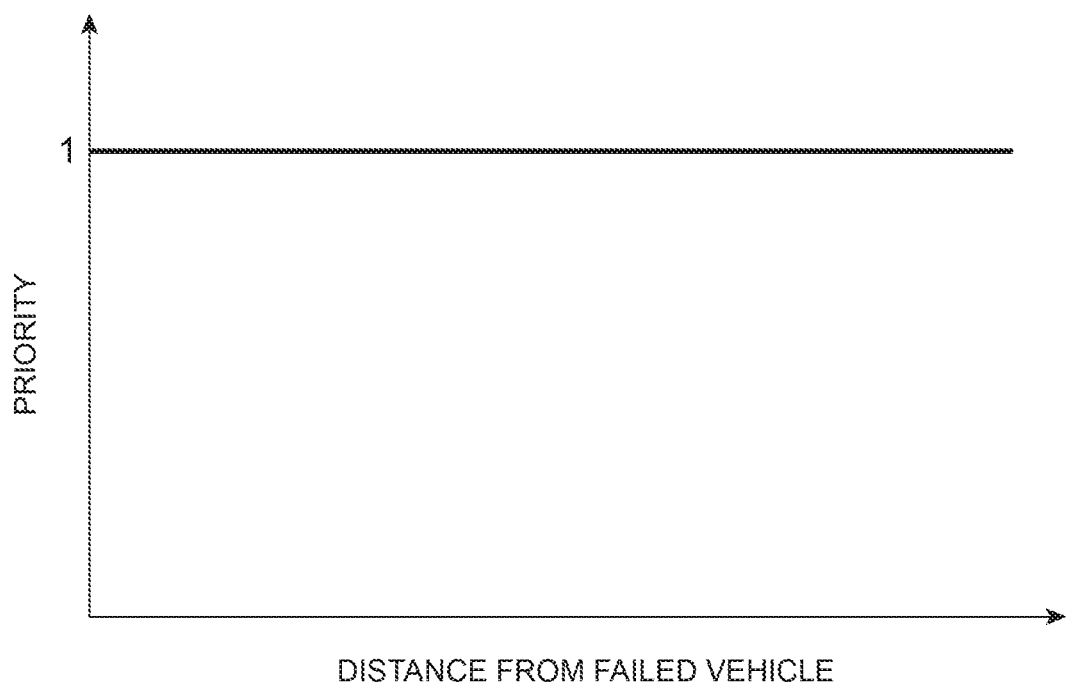
FIG. 8 is a graph for illustrating an example of settings of priorities for an allowed area in a row different from a row of a restricted area.

The priority setting unit 16 calculates the priorities of parking spaces in allowed areas based on a distance from the position of a failed vehicle. FIG. 7A, FIG. 7B, and FIG. 8 are graphs for illustrating examples of settings of priorities. In FIG. 7A, FIG. 7B, and FIG. 8, the abscissa axis represents a distance from the position of a failed vehicle, and the ordinate axis represents a priority. A maximum value of priority is not limited, and is defined as, for example, one.

FIG. 7A and FIG. 7B are examples of settings of priorities for an allowed area in the row same as the row of a restricted area. As shown in FIG. 7A, the priority setting unit 16, for example, sets priorities for an allowed area in the row same as the row of a restricted area such that the priority increases as a distance from the position of a failed vehicle increases. The priority setting unit 16 may set priorities such that the priority reaches the maximum value, that is, one, at a predetermined distance. In the example of FIG. 4, for priorities set to the allowed area A1 in the row same as the row of the restricted area R1, the priority of a parking space 61e is higher than the priority of a parking space 61d. Thus, in the allowed area A1, the priority of the parking space 61e is the highest.

The priority setting unit 16 may set the maximum value of the priority to lower than one. As shown in FIG. 7B, the priority setting unit 16 may set priorities such that the priority reaches a predetermined upper limit lower than the maximum value at a predetermined distance.

FIG. 8 is an example of settings of priorities for an allowed area in a row different from the row of a restricted area. As shown in FIG. 8, the priority setting unit 16, for example, sets priorities for an allowed area in a row different from the row of a restricted area such that the priority becomes a constant value regardless of a distance from the position of a failed vehicle. The priority setting unit 16, for example, sets the priority of an allowed area in a row different from the row of a restricted area to a constant value (here, one). The priority setting unit 16, for example, may set the priority of an allowed area in a row different from the row of a restricted area to a constant value lower than one. In the example of FIG. 4, the priority of each of the allowed areas A2, A3, A4 in rows different from the row of the restricted area R1 is set to one. Thus, in the allowed areas A2, A3, A4, the priorities of all the parking spaces are equal and maximum.

Alternatively, the priority setting unit 16 may calculate the priorities of parking spaces in an allowed area based on a type of failure of a failed vehicle. The priority setting unit 16, for example, may calculate the priorities of parking spaces in an allows area based on whether a failed vehicle is able to retreat regardless of whether the allowed area is in the row same as the row of the restricted area. The case where a failed vehicle is able to retreat is, for example, a situation in which the above-described vehicle abnormality related to running of automated driving is not occurring and at least any one of the above-described vehicle abnormality related to parking of automated driving and communication interruption is occurring. The case where a failed vehicle is not able to retreat is, for example, a situation in which the above-described vehicle abnormality related to running of automated driving is occurring.

Figure 9A:
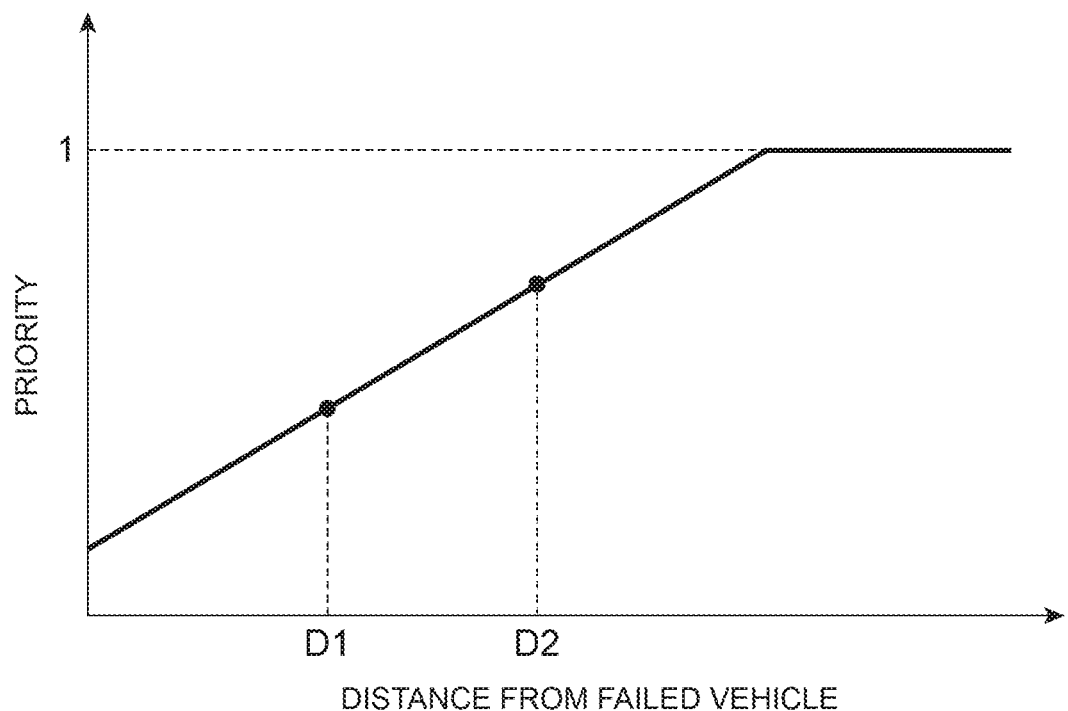
FIG. 9A is a graph for illustrating an example of settings of priorities based on a type of failure of a failed vehicle.
Figure 9B:
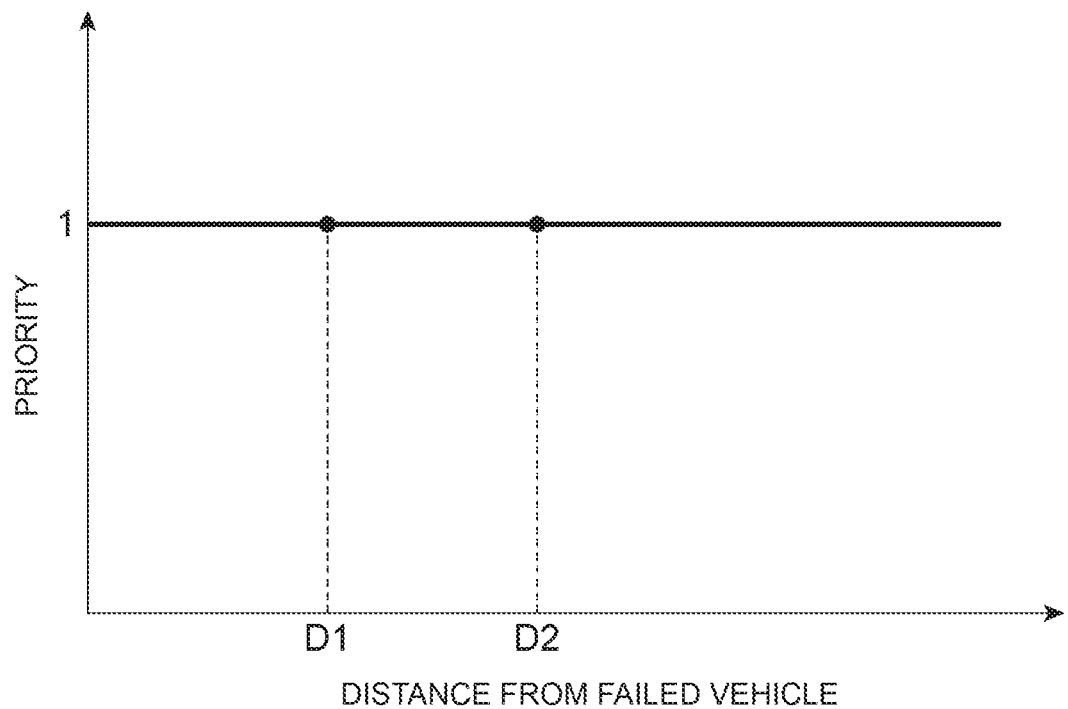
FIG. 9B is a graph for illustrating an example of settings of priorities based on a type of failure of a failed vehicle.

FIG. 9A and FIG. 9B are graphs for illustrating examples of settings of priorities based on a type of failure of a failed vehicle. As shown in FIG. 9A, when a failed vehicle is not able to retreat, the priority setting unit 16, for example, sets priorities such that the priority increases as a distance from the position of a failed vehicle increases. As shown in FIG. 9B, when a failed vehicle is able to retreat, the priority setting unit 16, for example, sets the priority of an allowed area to a constant value (here, one). Therefore, in this case, as shown in FIG. 9A and FIG. 9B, even when the positions of which distances from the position of a failed vehicle are the same (for example, the positions of the distance D1 or the positions of the distance D2), the priority is changed according to whether the failed vehicle is able to retreat.

In FIG. 7A, FIG. 7B, and FIG. 8, a distance from the position of a failed vehicle may be, for example, a distance from a node at which the failed vehicle is located to a different node or a distance from any one of a pair of nodes on both sides of the position of the failed vehicle to a different node. A distance from the position of a failed vehicle is not limited thereto. For example, a distance from the position of a failed vehicle may be a straight distance (radius distances of concentric circles) on the parking place map from the position of the failed vehicle.

The vehicle instruction unit 17 provides an instruction to the self-driving vehicle 2 that performs automated valet parking. When the self-driving vehicle 2 starts automated valet parking, the vehicle instruction unit 17 provides an instruction for a target route of the self-driving vehicle 2 to reach a target parking space. A method of determining a target parking space is not limited. Parking spaces may be allocated from an exit side in order of entry into the parking place or may be allocated from an exit side in the ascending order of reserved pick-up time. A user may designate a target parking space.

The vehicle instruction unit 17 does not need to provide an instruction for the entire target route from the current position of the self-driving vehicle 2 to a target parking space at a time and may be configured to provide an instruction for part of the target route. The vehicle instruction unit 17 provides an instruction for a target route to reach the pick-up space 63 at the time of pick-up of the self-driving vehicle 2.

The vehicle instruction unit 17 calculates a target route from the position of the subject vehicle 2 to a target parking space based on the position of the subject vehicle 2, acquired by the vehicle information acquisition unit 11. The vehicle instruction unit 17, for example, calculates a route along which the subject vehicle 2 reaches a target parking space by a shortest travel distance along the driving passages in the parking place as a target route. The vehicle instruction unit 17 may calculate a new target route of the subject vehicle 2 such that the target route does not cross a target route of another one of the self-driving vehicles 2. The vehicle instruction unit 17 may determine a target parking space in consideration of a target route. The vehicle instruction unit 17 may provide an instruction for an upper limit vehicle speed in the parking place together with a target route. The vehicle instruction unit 17 may provide an instruction for an upper limit acceleration. An upper limit vehicle speed and an upper limit acceleration are determined in advance.

The vehicle instruction unit 17 provides a stop instruction and a moving instruction in response to a situation of the other self-driving vehicles 2, recognized by the vehicle situation recognition unit 12. A stop instruction is an instruction to stop a self-driving vehicle 2. A forward moving instruction is an instruction to move (start) a stopped self-driving vehicle 2. The vehicle instruction unit 17 may provide an instruction to decelerate or accelerate a self-driving vehicle 2. The vehicle instruction unit 17 controls stop and move of a self-driving vehicle 2 according to the situation of the other self-driving vehicles 2. Thus, the vehicle instruction unit 17 causes the self-driving vehicle 2 to run to a target parking space while avoiding an approach to the other self-driving vehicles 2. In the present embodiment, the vehicle instruction unit 17 does not necessarily provide a stop instruction or a moving instruction.

When a self-driving vehicle 2 makes a request for retreat guidance as a result of recognizing a vehicle abnormality by itself, the vehicle instruction unit 17 provides an instruction for a retreat space to the failed vehicle. The vehicle instruction unit 17 performs retreat guidance while using the nearest parking space, a side of the driving passage, or the like, as a retreat space. A retreat space may be not a parking space for one vehicle and may be set so as to lie across adjacent empty parking spaces for two vehicles.

When the vehicle situation recognition unit 12 determines that a self-driving vehicle 2 has become a failed vehicle because of a vehicle abnormality not by a determination made by the self-driving vehicle 2, the vehicle instruction unit 17 provides an instruction to stop in an emergency to the failed vehicle. In this case, the failed vehicle stops at a current position. The vehicle instruction unit 17 may perform retreat guidance to a retreat space depending on the situation of the failed vehicle (that is, whether the failed vehicle is able to retreat).

A retreat instruction is an instruction to retreat to a position where a failed vehicle does not interfere with running of the other automated driving vehicles 2, such as an empty parking space, a side of the driving passage, or the like. The vehicle instruction unit 17 may provide a retreat instruction to retreat a failed vehicle to a position astride adjacent empty parking spaces for two vehicles not a parking space for one vehicle. The vehicle instruction unit 17 may provide a retreat instruction to retreat a failed vehicle to a parking space between adjacent empty right and left parking spaces (a center parking space of empty parking spaces for three vehicles).

The vehicle instruction unit 17 provides an instruction to a subject vehicle 2 based on a position of the subject vehicle 2 and a restricted area set by the restricted area setting unit 15. The vehicle instruction unit 17 sets a target route for the subject vehicle 2 such that the subject vehicle 2 parks in a parking space located in an allowed area.

When another one of the self-driving vehicles 2 becomes a failed vehicle before a start of automated parking of the subject vehicle 2, the vehicle instruction unit 17 sets a target route for the subject vehicle 2 based on a restricted area set before the start of automated parking of the subject vehicle 2 according to the failed vehicle, such that the subject vehicle 2 parks in a parking space located in an allowed area other than the restricted area.

When another one of the self-driving vehicles 2 becomes a subsequent failed vehicle after a start of automated parking of the subject vehicle 2, the vehicle instruction unit 17 resets a target route for the subject vehicle 2 based on a subsequent restricted area set according to the subsequent failed vehicle such that the subject vehicle 2 parks in a parking space located in an allowed area other than a restricted area including the subsequent restricted area. The vehicle instruction unit 17, for example, determines whether the target route before occurrence of the subsequent failed vehicle passes through the subsequent restricted area. When the vehicle instruction unit 17 determines that the target route before occurrence of the subsequent failed vehicle passes through the subsequent restricted area, the vehicle instruction unit 17 resets a target route for the subject vehicle 2 such that the subject vehicle 2 parks in a parking space located in an allowed area other than the restricted area including the subsequent restricted area.

For an entry subject vehicle that is a subject vehicle 2 serving as a subject of an entry request, the vehicle instruction unit 17 sets a target route for the subject vehicle based on priorities set for parking spaces in an allowed area. For an entry subject vehicle that is a subject vehicle serving as a subject of an entry request, the vehicle instruction unit 17, for example, sets a target route for the subject vehicle such that the subject vehicle parks in a parking space having the highest priority in the allowed area.

When another one of the self-driving vehicles 2 becomes a failed vehicle before a start of automated parking of the subject vehicle 2, the vehicle instruction unit 17 sets a target route for the subject vehicle 2 based on the priorities set before the start of automated parking of the subject vehicle 2 according to the failed vehicle such that the subject vehicle 2 parks in a parking space having the highest priority.

When another one of the self-driving vehicles 2 becomes a subsequent failed vehicle after a start of automated parking of the subject vehicle 2, the vehicle instruction unit 17 sets a target route for the subject vehicle 2 based on the priorities set according to the subsequent failed vehicle such that the subject vehicle 2 parks in a parking space having the highest priority. For example, when the vehicle instruction unit 17 does not determine that a target route before occurrence of a subsequent failed vehicle passes through a subsequent restricted area, the vehicle instruction unit 17 determines whether there is a parking space (allowed area) having a higher priority than the priority of the target parking space of the target route. When the vehicle instruction unit 17 determines that there is a parking space having a higher priority than the priority of the target parking space of the target route before occurrence of a subsequent failed vehicle, the vehicle instruction unit 17 resets a target route for the subject vehicle 2 such that the subject vehicle 2 parks in the parking space having the highest priority of the parking spaces located in the allowed area.

For example, in the situation of FIG. 4, for example, when it is assumed that the failed vehicle F1 has occurred before the start of automated parking of the subject vehicle S2, the target route of the subject vehicle S2 is set such that the subject vehicle S2 parks in a parking space having the highest priority of the parking spaces included in the allowed areas A2, A3, A4, and automated parking of the subject vehicle S2 is started. Specifically, the restricted area R1 is set by the restricted area setting unit 15 before the start of automated parking of the subject vehicle S2 according to the failed vehicle F1 that has occurred before the start of automated parking of the subject vehicle S2. The vehicle instruction unit 17 sets a target route of the subject vehicle S2 based on the restricted area R1 such that the subject vehicle S2 parks in a parking space located in the allowed areas A2, A3, A4 other than the restricted area R1. Here, the target route is set before the subject vehicle S2 passes through the node N6, so the allowed areas A2, A3, A4 are used as allowed areas.

In the situation of FIG. 4, for example, when it is assumed that the failed vehicle F1 has occurred after the start of automated parking of the subject vehicle S1, an initial target route CX of the subject vehicle S1 is reset to the target route C1. Specifically, the restricted area R1 is set by the restricted area setting unit 15 after the start of automated parking of the subject vehicle S1 according to the subsequent failed vehicle F1 that has occurred after the start of automated parking of the subject vehicle S1. The vehicle instruction unit 17 determines that the target route CX before occurrence of the subsequent failed vehicle F1 passes through the subsequent restricted area R1, and resets the target route of the subject vehicle S1 to the target route C1 such that the subject vehicle S1 parks in the parking space 61e located in the allowed area A1 other than the subsequent restricted area R1 (restricted area R1). The parking space 61e is a parking space having the highest priority of the parking spaces 61d, 61e included in the allowed area A1. Here, a target route is reset after the subject vehicle S1 passes through the node N6, so the allowed area A1 is used as an allowed area.

Subsequently, the self-driving vehicle 2 and the user front end 3 that communicate with the parking place management server 1 will be described. The automated valet parking system 100 according to the present embodiment does not necessarily include the self-driving vehicle 2 or the user front end 3.

As shown in FIG. 1, the self-driving vehicle 2 includes a self-driving ECU 20 as an example. The self-driving ECU 20 is an electronic control unit including a CPU, a ROM, a RAM, and the like. In the self-driving ECU 20, for example, a program recorded on the ROM is loaded onto the RAM, and the CPU runs the program loaded on the RAM. Thus, various functions are implemented. The self-driving ECU 20 may be made up of a plurality of electronic control units.

The self-driving ECU 20 is connected to a communication unit 21, an external sensor 22, an internal sensor 23, and an actuator 24.

The communication unit 21 is a communication device that controls wireless communication with a device outside the self-driving vehicle 2. The communication unit 21 sends and receives various pieces of information by communication with the parking place management server 1. The communication unit 21, for example, sends vehicle information to the parking place management server 1 and acquires information required for automated valet parking (for example, information on a landmark along a target route) from the parking place management server 1. The communication unit 21 communicates with the user front end 3 associated with the self-driving vehicle 2.

The external sensor 22 is an in-vehicle sensor that detects an environment outside the self-driving vehicle 2. The external sensor 22 includes at least a camera. The camera is an imaging device that captures the image of an environment outside the self-driving vehicle 2. The camera is provided on the back side of a windshield of the self-driving vehicle 2 and captures an image ahead of the vehicle. The camera sends captured information on the environment outside the self-driving vehicle 2 to the self-driving ECU 20. The camera may be a monocular camera or a stereo camera. A plurality of the cameras may be provided and may capture images to the right and left and behind in addition to the image ahead of the self-driving vehicle 2.

The external sensor 22 may include a radar sensor. The radar sensor is a detector that detects an object around the self-driving vehicle 2 by using radio waves (for example, millimeter waves) or light. Examples of the radar sensor include a millimeter wave radar and light detection and ranging (LIDAR). The radar sensor transmits radio waves or light to an area around the self-driving vehicle 2 and receives radio waves or light reflected by an object. Thus, the radar sensor detects an object. The radar sensor transmits detected object information to the self-driving ECU 20. The external sensor 22 may include a sonar sensor that detects a sound outside the self-driving vehicle 2.

The internal sensor 23 is an in-vehicle sensor that detects a running status of the self-driving vehicle 2. The internal sensor 23 includes a vehicle speed sensor, an acceleration sensor, and a yaw rate sensor. The vehicle speed sensor is a detector that detects the speed of the self-driving vehicle 2. The vehicle speed sensor may be a wheel speed sensor that is provided on each wheel of the self-driving vehicle 2 or a drive shaft, or the like, rotating integrally with each wheel and detects the rotation speed of each wheel. The vehicle speed sensor transmits detected vehicle speed information (wheel speed information) to the self-driving ECU 20.

The acceleration sensor is a detector that detects the acceleration of the self-driving vehicle 2. The acceleration sensor, for example, includes a longitudinal acceleration sensor that detects the acceleration of the self-driving vehicle 2 in the front-rear direction. The acceleration sensor may include a lateral acceleration sensor that detects the lateral acceleration of the self-driving vehicle 2. The acceleration sensor, for example, transmits acceleration information of the self-driving vehicle 2 to the self-driving ECU 20. The yaw rate sensor is a detector that detects a yaw rate (rotation angular velocity) about the vertical axis at the center of gravity of the self-driving vehicle 2. The yaw rate sensor may be, for example, a gyro sensor. The yaw rate sensor, for example, transmits information on the yaw rate of the self-driving vehicle 2 to the self-driving ECU 20.

The actuator 24 is a device that is used to control the self-driving vehicle 2. The actuator 24 at least includes a drive actuator, a brake actuator, and a steering actuator. The drive actuator controls the amount of air supplied to an engine (throttle opening degree) in response to a control signal from the self-driving ECU 20, and controls the driving force of the self-driving vehicle 2. When the self-driving vehicle 2 is a hybrid vehicle, a control signal from the self-driving ECU 20 is input to a motor that serves as a power source and the driving force is controlled, in addition to control over the amount of air supplied to the engine. When the self-driving vehicle 2 is an electric vehicle, a control signal from the self-driving ECU 20 is input to a motor that serves as a power source, and the driving force is controlled. The motor that serves as a power source in these cases is a component of the actuator 24.

The brake actuator controls a brake system in response to a control signal from the self-driving ECU 20, and controls braking force that is applied to the wheels of the self-driving vehicle 2. The brake system may be, for example, a hydraulic brake system. The steering actuator controls an assist motor within an electric power steering system in response to a control signal from the self-driving ECU 20. The assist motor controls steering torque. Thus, the steering actuator controls the steering torque of the self-driving vehicle 2.

Next, an example of the functional configuration of the self-driving ECU 20 will be described. The self-driving ECU 20 includes an external environment recognition unit 31, a running status recognition unit 32, a vehicle position recognition unit 33, a vehicle information providing unit 34, and a vehicle control unit 35.

The external environment recognition unit 31 recognizes an external environment outside the self-driving vehicle 2 based on a detected result of the external sensor 22 (a captured image of the camera or object information detected by the radar sensor). An external environment includes the relative position of a surrounding object to the self-driving vehicle 2. The external environment may include the relative velocity and moving direction of a surrounding object to the self-driving vehicle 2. The external environment recognition unit 31 recognizes an object, such as another vehicle and a pillar of the parking place, by pattern matching, or the like. The external environment recognition unit 31 may recognize a gate of the parking place, a wall of the parking place, a pole, a safety cone, or the like. The external environment recognition unit 31 may recognize driving boundaries in the parking place by white line recognition.

The running status recognition unit 32 recognizes the running status of the self-driving vehicle 2 based on a detected result of the internal sensor 23. A running status includes the vehicle speed of the self-driving vehicle 2, the acceleration of the self-driving vehicle 2, and the yaw rate of the self-driving vehicle 2. Specifically, the running status recognition unit 32 recognizes the vehicle speed of the self-driving vehicle 2 based on vehicle speed information of the vehicle speed sensor. The running status recognition unit 32 recognizes the acceleration of the self-driving vehicle 2 based on acceleration information of the acceleration sensor. The running status recognition unit 32 recognizes the direction of the self-driving vehicle 2 based on yaw rate information of the yaw rate sensor.

The vehicle position recognition unit 33 recognizes the position of the self-driving vehicle 2 in the parking place based on the parking place map information acquired from the parking place management server 1 through the communication unit 21 and the external environment recognized by the external environment recognition unit 31.

The vehicle position recognition unit 33 recognizes the position of the self-driving vehicle 2 in the parking place based on the position information of the landmark in the parking place, included in parking place map information, and the relative position of the landmark to the self-driving vehicle 2, recognized by the external environment recognition unit 31. A landmark may be an object fixedly provided in the parking place. A landmark may be at least one of, for example, the pillar of the parking place, the wall of the parking place, a pole, a safety cone, and the like. A landmark may be driving boundaries.

Other than the above, the vehicle position recognition unit 33 may recognize the position of the self-driving vehicle 2 by dead reckoning based on a detected result of the internal sensor 23. The vehicle position recognition unit 33 may recognize the position of the self-driving vehicle 2 by communication with a beacon provided in the parking place.

The vehicle information providing unit 34 provides vehicle information to the parking place management server 1 through the communication unit 21. The vehicle information providing unit 34, for example, provides the parking place management server 1 at intervals of a set time with vehicle information containing information on the position of the self-driving vehicle 2 in the parking place, recognized by the vehicle position recognition unit 33.

When a vehicle abnormality is detected, the vehicle information providing unit 34 provides the parking place management server 1 with vehicle information containing failure information on the vehicle abnormality. A method of detecting a vehicle abnormality (various failures) is not limited, and a known technique may be employed.

The vehicle control unit 35 executes automated driving of the self-driving vehicle 2. In automated driving, the self-driving vehicle 2 is caused to automatically run along a target route provided by an instruction from the parking place management server 1. The vehicle control unit 35, for example, generates a trajectory of the self-driving vehicle 2 based on the target route, the position of the self-driving vehicle 2, the external environment around the self-driving vehicle 2, and the running status of the self-driving vehicle 2. A trajectory corresponds to a driving plan of automated driving. A trajectory includes a path along which the vehicle runs by means of automated driving and a vehicle speed plan in automated driving.

A path is a scheduled path along which the vehicle runs on a target route during automated driving. A path may be, for example, data of changes in steering angle (steering angle plan) of the self-driving vehicle 2 for a position on a target route. A position on a target route is, for example, a set longitudinal position set at every predetermined interval (for example, 1 m) in the direction of travel of the target route. A steering angle plan is data associated with a target steering angle at each set longitudinal position.

The vehicle control unit 35, for example, generates a trajectory such that the trajectory runs along the center of driving passages of the parking place along a target route. When an upper limit vehicle speed is provided as an instruction from the parking place management server 1, the vehicle control unit 35 generates a trajectory such that a vehicle speed plan does not exceed the upper limit vehicle speed. The vehicle control unit 35 may generate a trajectory by using the parking place map information acquired through communication with the parking place management server 1.

When the vehicle control unit 35 receives a stop instruction from the parking place management server 1, the vehicle control unit 35 stops the self-driving vehicle 2. When the vehicle control unit 35 receives a moving instruction from the parking place management server 1, the vehicle control unit 35 causes the stopped self-driving vehicle 2 to move. An example of the configuration of the self-driving vehicle 2 is described above. The self-driving vehicle 2 is not limited to the above-described configuration as long as the self-driving vehicle 2 is able to realize automated valet parking.

The user front end 3 is a user mobile information terminal associated with the self-driving vehicle 2. The user front end 3 is, for example, registered in the self-driving vehicle 2 as the front end of the owner of the self-driving vehicle 2. The user front end 3 may be a front end of a user registered as a temporary owner that rents the self-driving vehicle 2 or an authorized owner in the self-driving vehicle 2 by the transfer of designated authorization from an owner. The user front end 3 is made up of, for example, a computer including a processor, such as a CPU, a memory, such as a ROM and a RAM, and a user interface including a display and touch panel, and the like.

The user front end 3 has the function to issue an entry request and a pick-up request to the parking place management server 1. The user is able to issue an entry request and a pick-up request for automated valet parking by operating the user front end 3. The user, for example, stops the self-driving vehicle 2 at the drop-off space 62 of the drop-off area 52 in the parking place 50, gets off the self-driving vehicle 2, and then gives an instruction authorization for the self-driving vehicle 2 to the parking place management server 1 by operating the user front end 3 to complete an entry request.

The user causes the self-driving vehicle 2 parked in the parking space 61 to run to the pick-up space 63 of the pick-up area 53 via the parking place management server 1 by issuing a pick-up request. The self-driving vehicle 2 waits for the user in the pick-up space 63. For example, when the self-driving vehicle 2 reaches the pick-up space 63 and stops, the parking place management server 1 ends the instruction authorization for the self-driving vehicle 2. The instruction authorization may be ended when the user issues an instruction to open the door or start to the self-driving vehicle 2. The instruction authorization may be ended by the self-driving vehicle 2. The operation of the self-driving vehicle 2 accompanying an entry request and a pick-up request is not limited to the above-described mode. The same applies to the parking place management server 1.

Process of Automated Valet Parking System

Next, the process of the automated valet parking system 100 will be described with reference to the accompanying drawings. FIG. 10 is a flowchart that shows an example of a vehicle abnormality notification process in the self-driving vehicle 2. The vehicle abnormality notification process is executed in the self-driving vehicle 2 during automated valet parking.

As shown in FIG. 10, the self-driving ECU 20 of the self-driving vehicle 2 determines in S10 whether there occurs a vehicle abnormality in the self-driving vehicle 2. A method of detecting a vehicle abnormality is not limited, and a known technique may be employed. When the self-driving ECU 20 determines that there occurs a vehicle abnormality in the self-driving vehicle 2 (YES in S10), the self-driving ECU 20 proceeds to S11. When the self-driving ECU 20 does not determine that there occurs a vehicle abnormality in the self-driving vehicle 2 (NO in S10), the self-driving ECU 20 ends the current process.

In S11, the self-driving ECU 20 causes the vehicle information providing unit 34 to provide notification to the parking place management server 1. The vehicle information providing unit 34 provides notification of a vehicle abnormality by providing the parking place management server 1 with vehicle information containing failure information on the vehicle abnormality. After that, the self-driving ECU 20 ends the current process.

FIG. 11 is a flowchart that shows an example of a target route setting process in the parking place management server 1. The target route setting process of FIG. 11 is started when occurrence of a vehicle abnormality is determined based on vehicle information sent by the process of FIG. 10 from another one of the self-driving vehicles 2 before a start of automated parking of a subject vehicle 2.

As shown in FIG. 11, in S20, the parking place management server 1 causes the vehicle situation recognition unit 12 to recognize the position of the failed vehicle, and the position and target route of the subject vehicle 2. In S21, the parking place management server 1 causes the node status setting unit 13 to set node statuses.

In S22, the parking place management server 1 causes the restricted area setting unit 15 to set restricted areas. In S23, the parking place management server 1 causes the restricted area setting unit 15 to set allowed areas.

In S24, the parking place management server 1 causes the priority setting unit 16 to set priorities for the allowed areas. In S25, the parking place management server 1 causes the vehicle instruction unit 17 to set a target route for the subject vehicle 2 such that the subject vehicle 2 parks in a parking space having the highest priority. After that, the parking place management server 1 ends the current process.

FIG. 12 is a flowchart that shows an example of a target route setting process caused by communication interruption in the parking place management server 1. The parking place management server 1 executes the target route setting process of FIG. 12, caused by communication interruption of another one of the self-driving vehicles 2 before a start of automated parking of a subject vehicle 2.

As shown in FIG. 12, in S30, the parking place management server 1 causes the vehicle situation recognition unit 12 to determine whether there occurs communication interruption in the self-driving vehicle 2. When the parking place management server 1 determines that there occurs communication interruption in the self-driving vehicle 2 (YES in S30), the parking place management server 1 proceeds to S31. When the parking place management server 1 does not determine that there occurs communication interruption in the self-driving vehicle 2 (NO in S30), the parking place management server 1 ends the current process.

In S31, the parking place management server 1 causes the vehicle situation recognition unit 12 to recognize the position of the failed vehicle and the position and target route of the subject vehicle 2. In S32, the parking place management server 1 causes the node status setting unit 13 to set node statuses.

In S33, the parking place management server 1 causes the restricted area setting unit 15 to set restricted areas. In S34, the parking place management server 1 causes the restricted area setting unit 15 to set allowed areas.

In S35, the parking place management server 1 causes the priority setting unit 16 to set priorities for the allowed areas. In S36, the parking place management server 1 causes the vehicle instruction unit 17 to set a target route for the subject vehicle 2 such that the subject vehicle 2 parks in a parking space having the highest priority. After that, the parking place management server 1 ends the current process.

Figure 13:
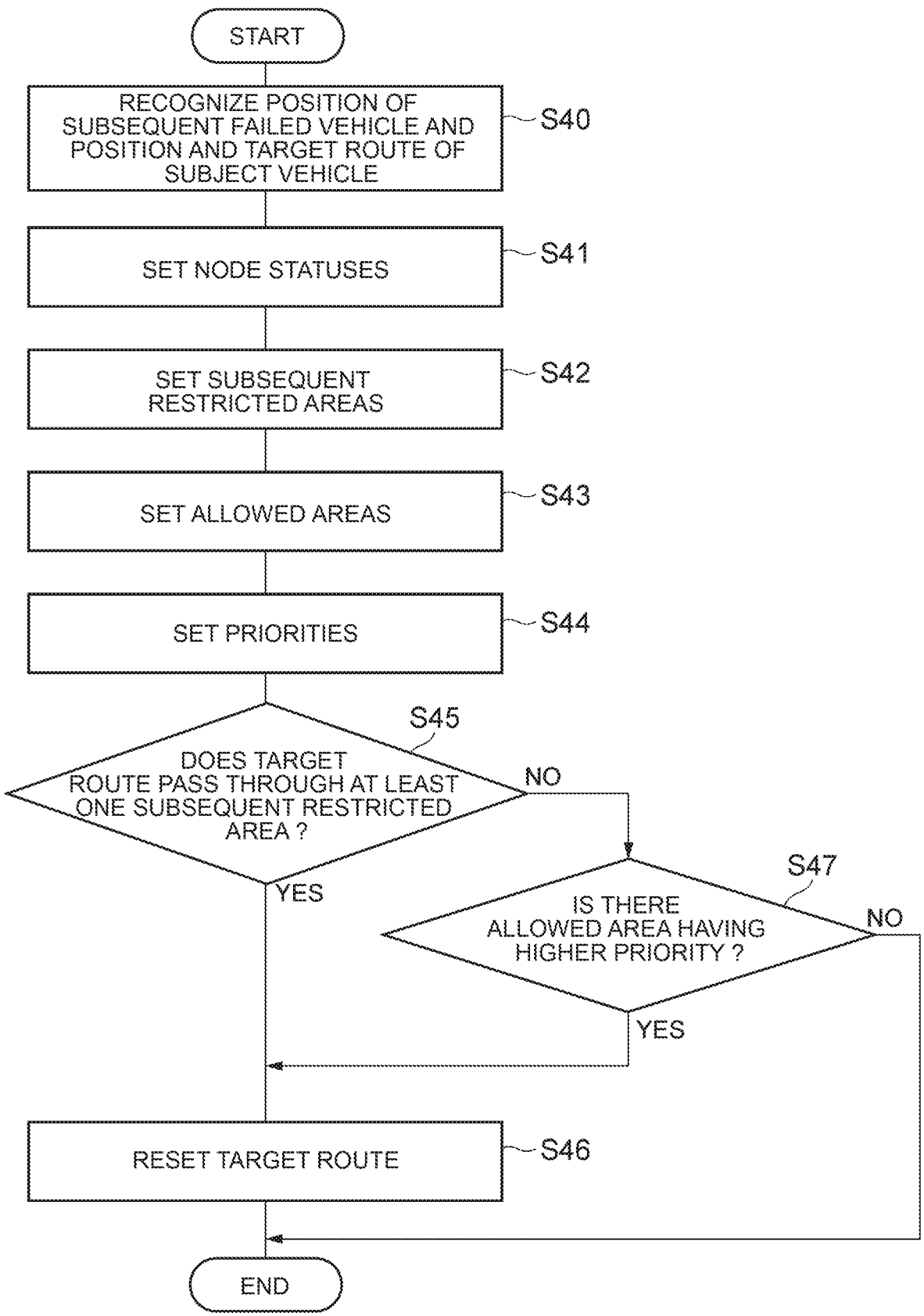
FIG. 13 is a flowchart that shows an example of a target route resetting process in the parking place management server.

Next, a process in the case where a subsequent failed vehicle occurs while automated parking of a subject vehicle 2 is being performed will be described. FIG. 13 is a flowchart that shows an example of a target route resetting process in the parking place management server 1. The target route resetting process of FIG. 13 is started when occurrence of a vehicle abnormality is determined based on vehicle information sent by the process of FIG. 10 from another one of the self-driving vehicles 2 after a start of automated parking of the subject vehicle 2.

As shown in FIG. 13, in S40, the parking place management server 1 causes the vehicle situation recognition unit 12 to recognize the position of a subsequent failed vehicle, and the position and target route of the subject vehicle 2. In S41, the parking place management server 1 causes the node status setting unit 13 to set node statuses.

In S42, the parking place management server 1 causes the restricted area setting unit 15 to set subsequent restricted areas. In S43, the parking place management server 1 causes the restricted area setting unit 15 to set allowed areas according to occurrence of the subsequent failed vehicle. In S44, the parking place management server 1 causes the priority setting unit 16 to set priorities for the allowed areas set according to occurrence of the subsequent failed vehicle.

In S45, the parking place management server 1 causes the vehicle instruction unit 17 to determine whether the target route passes through at least one subsequent restricted area. When the parking place management server 1 determines that the target route passes through at least one subsequent restricted area (YES in S45), the parking place management server 1 proceeds to S46. When the parking place management server 1 does not determine that the target route passes through at least one subsequent restricted area (NO in S45), the parking place management server 1 proceeds to S47.

In S46, the parking place management server 1 causes the vehicle instruction unit 17 to reset the target route. The vehicle instruction unit 17, for example, resets the target route for the subject vehicle 2 such that the subject vehicle 2 parks in a parking space having the highest priority in the allowed areas set according to occurrence of the subsequent failed vehicle. After that, the parking place management server 1 ends the current process.

In S47, the parking place management server 1 causes the vehicle instruction unit 17 to determine whether there is an allowed area having a higher priority in the allowed areas set according to occurrence of the subsequent failed vehicle. When the parking place management server 1 determines that there is an allowed area having a higher priority in the allowed areas set according to occurrence of the subsequent failed vehicle (YES in S47), the parking place management server 1 proceeds to S46, and executes the process in S46. When the parking place management server 1 does not determine that there is an allowed area having a higher priority in the allowed areas set according to occurrence of the subsequent failed vehicle (NO in S47), the parking place management server 1 determines that reset of the target route is not needed, and ends the current process.

Figure 14:
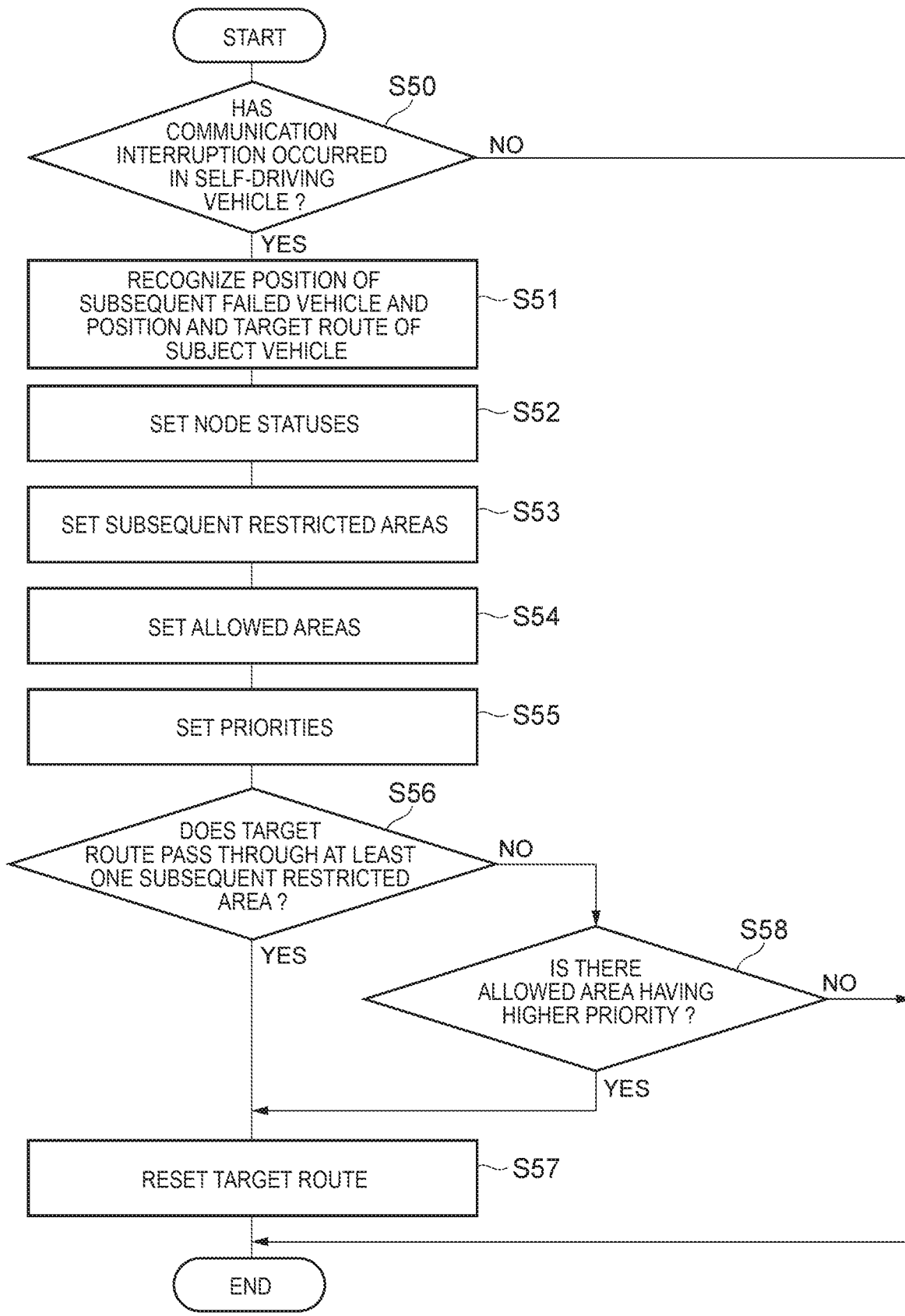
FIG. 14 is a flowchart that shows an example of a target route resetting process caused by communication interruption in the parking place management server.

FIG. 14 is a flowchart that shows an example of a target route resetting process caused by communication interruption in the parking place management server 1. The parking place management server 1 executes the target route resetting process of FIG. 14, caused by communication interruption of another one of the self-driving vehicles 2 after a start of automated parking of a subject vehicle 2.

As shown in FIG. 14, in S50, the parking place management server 1 causes the vehicle situation recognition unit 12 to determine whether there occurs communication interruption in the self-driving vehicle 2. When the parking place management server 1 determines that there occurs communication interruption in the self-driving vehicle 2 (YES in S50), the parking place management server 1 proceeds to S51. When the parking place management server 1 does not determine that there occurs communication interruption in the self-driving vehicle 2 (NO in S50), the parking place management server 1 ends the current process.

In S51, the parking place management server 1 causes the vehicle situation recognition unit 12 to recognize the position of the subsequent failed vehicle and the position and target route of the subject vehicle 2. In S52, the parking place management server 1 causes the node status setting unit 13 to set node statuses.

In S53, the parking place management server 1 causes the restricted area setting unit 15 to set subsequent restricted areas. In S54, the parking place management server 1 causes the restricted area setting unit 15 to set allowed areas according to occurrence of the subsequent failed vehicle. In S55, the parking place management server 1 causes the priority setting unit 16 to set priorities for the allowed areas set according to occurrence of the subsequent failed vehicle.

In S56, the parking place management server 1 causes the vehicle instruction unit 17 to determine whether the target route passes through at least one subsequent restricted area. When the parking place management server 1 determines that the target route passes through at least one subsequent restricted area (YES in S56), the parking place management server 1 proceeds to S57. When the parking place management server 1 does not determine that the target route passes through at least one subsequent restricted area (NO in S56), the parking place management server 1 proceeds to S58.

In S57, the parking place management server 1 causes the vehicle instruction unit 17 to reset the target route. The vehicle instruction unit 17, for example, resets the target route for the subject vehicle 2 such that the subject vehicle 2 parks in a parking space having the highest priority in the allowed areas set according to occurrence of the subsequent failed vehicle. After that, the parking place management server 1 ends the current process.

In S58, the parking place management server 1 causes the vehicle instruction unit 17 to determine whether there is an allowed area having a higher priority in the allowed areas set according to occurrence of the subsequent failed vehicle. When the parking place management server 1 determines that there is an allowed area having a higher priority in the allowed areas set according to occurrence of the subsequent failed vehicle (YES in S58), the parking place management server 1 proceeds to S57, and executes the process in S57. When the parking place management server 1 does not determine that there is an allowed area having a higher priority in the allowed areas set according to occurrence of the subsequent failed vehicle (NO in S58), the parking place management server 1 determines that reset of the target route is not needed, and ends the current process.

With the automated valet parking system 100 according to the above-described embodiment, when at least any one of the self-driving vehicles 2 stops in an emergency or experiences communication interruption and becomes a failed vehicle, a restricted area and an allowed area are set based on the parking place map information and the position of the failed vehicle, and a target route of the subject vehicle 2 is set such that the subject vehicle 2 parks in a parking space located in the allowed area. Thus, it is possible to park the subject vehicle 2 in a parking space located outside the restricted area and less likely to be influenced by the failed vehicle. As a result, in comparison with a case where automated parking of the subject vehicle 2 is performed without consideration of the failed vehicle, the influence of the failed vehicle on the subject vehicle 2 is reduced.

With the automated valet parking system 100, a failed vehicle may be a subsequent failed vehicle that the self-driving vehicle 2 other than the subject vehicle 2 stops in an emergency or experiences communication interruption and becomes a failed vehicle while automated parking of the subject vehicle 2 is being performed. The restricted area setting unit 15 sets a subsequent restricted area that is a restricted area based on the parking place map information and the position of the subsequent failed vehicle and sets an allowed area including the parking spaces 61 located outside the subsequent restricted area. When the target route of the subject vehicle 2 before occurrence of the subsequent failed vehicle passes through the subsequent restricted area, the vehicle instruction unit 17 resets the target route for the subject vehicle 2 such that the subject vehicle 2 parks in the parking space 61 located in the allowed area set according to occurrence of the subsequent failed vehicle. Thus, even when there occurs a subsequent failed vehicle while automated parking of the subject vehicle 2 is being performed, the influence of the failed vehicle on the subject vehicle 2 is reduced.

The automated valet parking system 100 includes the priority setting unit 16 that calculates the priorities of the parking spaces 61 in an allowed area based on a distance from the position of a failed vehicle. For an entry subject vehicle that is a subject vehicle 2 serving as a subject of an entry request, the vehicle instruction unit 17 sets a target route for the subject vehicle 2 such that the subject vehicle 2 parks in the parking space 61 having the highest priority in the allowed area. Thus, by using priorities set according to a distance from the position of the failed vehicle, the influence of the failed vehicle on the subject vehicle 2 is further reduced.

The automated valet parking system 100 includes the priority setting unit 16 that calculates the priorities of the parking spaces 61 in an allowed area based on a type of failure of a failed vehicle. For an entry subject vehicle that is a subject vehicle 2 serving as a subject of an entry request, the vehicle instruction unit 17 sets a target route for the subject vehicle 2 such that the subject vehicle 2 parks in the parking space 61 having the highest priority in the allowed area. In this case, by using priorities set according to a type of failure of the failed vehicle, the influence of the failed vehicle on the subject vehicle is further reduced.

The embodiment of the disclosure is described above; however, the disclosure is not limited to the above-described embodiment. The disclosure may be implemented in not only the above-described embodiment but also various modes with various changes or improvements based on the knowledge of persons skilled in the art.

The parking place management server 1 does not need to be directly communicable with the self-driving vehicles 2 and may be configured to communicate with the self-driving vehicles 2 via another server, or the like. The parking place management server 1 may communicate with the self-driving vehicles 2 via, for example, a management server installed at a maker of each self-driving vehicle 2, a server operated in mobility as a service (MaaS), or the like. In this case, a determination as to communication interruption may be performed in an intervening server.

The node status setting unit 13 does not necessarily set node statuses according to occurrence of a failed vehicle. The restricted area setting unit 15 does not necessarily set a restricted area as a parking space associated with a node placed in the node passage prohibited status according to occurrence of a failed vehicle. For example, the restricted area setting unit 15 may directly set a restricted area according to a distance from the position of a failed vehicle.

A failed vehicle does not necessarily include a subsequent failed vehicle. In this case, the restricted area setting unit 15 does not need to set a subsequent restricted area and an allowed area set according to occurrence of a subsequent failed vehicle. The vehicle instruction unit 17 does not need to reset a target route according to occurrence of a subsequent failed vehicle.

The priority setting unit 16 calculates priorities based on a distance from the position of a failed vehicle, or a distance from the position of a failed vehicle and a type of failure of the failed vehicle. Alternatively, the priority setting unit 16 may calculate priorities based on only a type of failure of a failed vehicle. For example, regardless of a distance from the position of a failed vehicle, the priority setting unit 16 may calculate priorities such that set values are switched in two steps according to whether a failed vehicle is able to retreat. Alternatively, the priority setting unit 16 may be omitted. In this case, the vehicle instruction unit 17 may set or reset a target route for a subject vehicle such that the subject vehicle parks in the parking space 61 selected from an allowed area based on a distance from a failed vehicle without consideration of priorities. Alternatively, the vehicle instruction unit 17 may set or reset a target route for a subject vehicle such that the subject vehicle parks in the parking space 61 located at any position in an allowed area.

The vehicle instruction unit 17 sets or resets a target route for a subject vehicle 2 such that the subject vehicle 2 parks in a parking space having the highest priority in an allowed area; however, the parking space in which the subject vehicle 2 parks is not necessarily the parking space having the highest priority. For example, the vehicle instruction unit 17 may set or reset the target route of a subject vehicle 2 such that the subject vehicle 2 parks in a parking space located closest to the subject vehicle 2 of parking spaces having priorities higher than or equal to a predetermined threshold. In this case, it is possible to speed up automated parking of a subject vehicle 2 while reducing the influence of a failed vehicle.

In the above-described embodiment, automated parking of a subject vehicle 2 for entry is described as an example; however, the disclosure may also be applied to automated parking of a subject vehicle 2 for pick-up. In this case, a restricted area may be a node at which a failed vehicle is located in a target route. A restricted area may be part of the pick-up space 63 according to the position of a failed vehicle that has occurred near the pick-up space 63 of the pick-up area 53.

What is claimed is:

1. An automated valet parking system that, by providing instructions to a plurality of self-driving vehicles in a parking place, performs automated parking in response to a user request for entry or pick-up from a user of an associated one of the self-driving vehicles and causes the associated one of the self-driving vehicles to perform automated driving along a target route to enter or pick up, the automated valet parking system comprising:
   a server configured to:
      when at least any one of the self-driving vehicles which is a first vehicle that stops in an emergency or experiences a communication interruption related to the first vehicle and becomes a first failed vehicle, set a restricted area that is an area in the parking place that includes a parking space, in which the automated parking of the self-driving vehicle other than the first failed vehicle is restricted, based on parking place map information and a position of the first failed vehicle, and set an allowed area that is an area in the parking place, including a parking space or parking spaces located outside the restricted area;

based on a position of a subject vehicle that is the self-driving vehicle serving as a subject of the user request, provide the instruction to the subject vehicle;
determine the parking space of the subject vehicle based on the restricted area and the allowed area; and
set the target route of the subject vehicle such that the subject vehicle parks in the determined parking space.

2. The automated valet parking system according to claim 1, wherein:
the server is configured to:
when a subsequent vehicle other than the first failed and the subject vehicle stops in an emergency or experiences a communication interruption related to the subsequent vehicle and becomes a subsequent failed vehicle while the automated parking of the subject vehicle is being performed, set a subsequent restricted area that is the restricted area based on the parking place map information and a position of the subsequent failed vehicle, and set the allowed area including a parking space or parking spaces located outside the subsequent restricted area; and
when the target route of the subject vehicle before occurrence of the subsequent failed vehicle passes through the subsequent restricted area, reset the target route such that the subject vehicle parks in the parking space located in the allowed area set according to occurrence of the subsequent failed vehicle.

3. The automated valet parking system according to claim 1, wherein the server is configured to:
calculate a priority of each parking space in the allowed area based on a distance from the position of the first failed vehicle,
for an entry subject vehicle that is the subject vehicle serving as a subject of an entry request, set the target route of the subject vehicle such that the subject vehicle parks in the parking space of which the priority is the highest in the allowed area.

4. The automated valet parking system according to claim 1, wherein the server is configured to:
calculate a priority of each parking space in the allowed area based on a type of failure of the first failed vehicle,
for an entry subject vehicle that is the subject vehicle serving as a subject of an entry request, set the target route of the subject vehicle such that the subject vehicle parks in the parking space of which the priority is the highest in the allowed area.

5. An automated valet parking system that, by providing instructions to a plurality of self-driving vehicles in a parking place, performs automated parking in response to a user request for entry or pick-up from a user of an associated one of the self-driving vehicles and causes the associated one of the self-driving vehicles to perform automated driving along a target route to enter or pick up, the automated valet parking system comprising:
a server configured to:
when at least any one of the self-driving vehicles which is a first vehicle that stops in an emergency or experiences a communication interruption related to the first vehicle and becomes a first failed vehicle, set a restricted area that is an area in the parking place, in which the automated parking of the self-driving vehicle other than the first failed vehicle is restricted, based on parking place map information and a position of the first failed vehicle, and set an allowed area that is an area in the parking place, including a parking space or parking spaces located outside the restricted area;
based on a position of a subject vehicle that is the self-driving vehicle serving as a subject of the user request, provide the instruction to the subject vehicle and set the target route of the subject vehicle such that the subject vehicle parks in the parking space located in the allowed area;
calculate a priority of each parking space in the allowed area based on a distance from the position of the first failed vehicle; and
for an entry subject vehicle that is the subject vehicle serving as a subject of an entry request, set the target route of the subject vehicle such that the subject vehicle parks in the parking space of which the priority is the highest in the allowed area.

* * * * *